US011601497B1

(12) United States Patent
Abhigyan et al.

(10) Patent No.: US 11,601,497 B1
(45) Date of Patent: Mar. 7, 2023

(54) SEAMLESS RECONFIGURATION OF DISTRIBUTED STATEFUL NETWORK FUNCTIONS

(71) Applicant: AT&T Intellectual Property I, L.P., Atlanta, GA (US)

(72) Inventors: Abhigyan, Basking Ridge, NJ (US); Kaustubh Joshi, Short Hills, NJ (US); Edward Scott Daniels, Wadsworth, OH (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/497,828

(22) Filed: Oct. 8, 2021

(51) Int. Cl.
*G06F 15/173* (2006.01)
*H04L 67/1029* (2022.01)
*H04L 67/1038* (2022.01)
*H04L 67/1031* (2022.01)

(52) U.S. Cl.
CPC ...... *H04L 67/1029* (2013.01); *H04L 67/1031* (2013.01); *H04L 67/1038* (2013.01)

(58) Field of Classification Search
CPC ............. H04L 67/1029; H04L 67/1031; H04L 67/1038
USPC .......................... 709/223–224; 718/104–105
See application file for complete search history.

(56) References Cited

U.S. PATENT DOCUMENTS

| | | | |
|---|---|---|---|
| 7,380,002 B2 * | 5/2008 | House | H04L 67/1001 718/105 |
| 10,616,321 B2 | 4/2020 | Abhigyan et al. | |
| 10,715,479 B2 * | 7/2020 | Das | H04L 67/1008 |
| 11,140,081 B2 | 10/2021 | Abhigyan et al. | |
| 2009/0193105 A1 * | 7/2009 | Charny | H04L 47/10 709/223 |
| 2014/0181295 A1 * | 6/2014 | Hindawi | H04L 67/104 709/224 |
| 2014/0310390 A1 * | 10/2014 | Sorenson, III | H04L 67/1038 709/223 |

OTHER PUBLICATIONS

Jin et al., "NetChain: Scale-Free Sub-RTT Coordination," Proceedings of the 15th USENIX Symposium on Networked Systems Design and Implementation (NSDI '18), Apr. 9-11, 2018, pp. 35-49.
Andersen et al., "FAWN: A Fast Array of Wimpy Nodes," SOSP '09, Oct. 11-14, 2009, ACM 2009.

* cited by examiner

*Primary Examiner* — Bharat Barot
(74) *Attorney, Agent, or Firm* — Hartman & Citrin LLC

(57) ABSTRACT

A system can include a gateway, a plurality of network function nodes, and a distributed load balancer including load balancer nodes each having a flow table portion stored thereon. The load balancer nodes can form a node chain having a tail and head nodes. A load balancer node can receive a packet from the gateway. In response, the load balancer node can generate a query, directed to the tail node, that identifies the packet and a network function identifier associated with a network function node that is proposed to handle a connection. The tail node can determine whether an entry for the connection exists in a flow table portion associated with the tail node. If not, the tail node can initiate an insert request for writing the entry for the connection via the head node. The entry can then be written to all load balancer nodes in the node chain.

20 Claims, 22 Drawing Sheets

US 11,601,497 B1

SEAMLESS RECONFIGURATION OF DISTRIBUTED STATEFUL NETWORK FUNCTIONS

BACKGROUND

Network data plane hardware and software can be characterized as either stateful or stateless. A network function may be referred to as being "stateful" if the network function maintains a state associated with an individual data flow such as, for example, a connection established using transmission control protocol ("a TCP connection"). A stateful network function such as, for example, a load balancer or a firewall, must observe all packets of single data flow in both forward and reverse directions to ensure that the function will operate correctly. Thus, stateful elements require flow affinity to be preserved. Preserving flow affinity, however, can be difficult in a distributed and/or elastically scaled computing environment.

A stateless network function that replaces a distributed stateful function may not preserve flow affinity in both directions of the data flow. Similarly, if a stateless network function is replaced with a stateful network function, flow affinity in the forward direction may be disrupted when a network function is added or removed. Moreover, scaling of stateful network functions (e.g., introducing a new instance of a stateful network function) can disrupt flows and/or flow affinity. Thus, one challenge in distributed computing environments is the task of interconnecting stateless and stateful network functions in a manner that preserves data flow affinity. With the growing trend of virtualizing stateful network functions such as, for example, load balancers, firewalls, network address translation ("NAT") devices, and the like, this challenge can be more pronounced. Stateful virtual network functions may be required to operate, communicate, and/or otherwise interact with stateless networking devices and/or hardware, and there may be no way to preserve flow affinity in such environments.

A gateway or other centralized device can store a flow table. A flow table can include entries for each flow path (e.g., keyed on a hash value generated based on packet headers). Such a flow table can require an entry for each flow and therefore can be large and expensive (in terms of resource usage) to maintain and/or query. Thus, the use of centralized flow tables can be inefficient and may not be practical for distributed computing environments.

SUMMARY

Layer-4 load balancers deployed in an Internet Service Provider's ("ISP's") network cloud should provide the affinity of inbound and outbound connections to stateful network functions. The concepts and technologies disclosed herein describe, inter alia, a high-performance system that meets this goal in the presence of failures of load balancer nodes and concurrent elastic scaling of the load balancer and network function nodes. Other aspects of this and similar systems are described in U.S. Pat. Nos. 10,616,321 and 11,140,081, which are incorporated herein by reference in their entireties. The innovative design of the disclosed system integrates packet forwarding with replication to efficiently replicate the entries for each connection at a chain of nodes. A key challenge in designing such a system is to elastically scale the system by managing an ensemble of these node chains overlaid on a consistent hashing ring. A disclosed protocol meets this challenge and provably guarantees connection affinity despite failures, additions, and/or removals of nodes.

In some embodiments, a system can include a gateway, a plurality of network function nodes, and a distributed load balancer including a plurality of load balancer nodes each having a flow table portion stored thereon. The plurality of load balancer nodes can form a node chain having a tail node and a head node. A first load balancer node of the plurality of load balancer nodes can receive a packet from the gateway. In response, the load balancer node can generate a query, directed to the tail node, that identifies the packet and a network function identifier associated with a network function node that is proposed to handle a connection. The tail node can determine whether an entry for the connection exists in a flow table portion associated with the tail node. If not, the tail node can initiate an insert request for writing the entry for the connection via the head node. The entry can then be written to all load balancer nodes in the node chain. The tail node can then forward a response to the first load balancer node, which, in turn, can send the packet to the network function node.

In some embodiments, each load balancer node to be included in the node chain can be computed based upon a unique connection key derived from a 5-tuple of a header of the packet, a node identifier, and a length of the node chain. The tail node can be computed by mapping the unique connection key to a circular keyspace and subsequently to a specific load balancer node of the plurality of load balancer nodes using a consistent hash function. The head node can be computed as a predecessor node of the tail node determined by the length of the node chain minus one node.

The node chain may be reconfigured causing an inconsistency in the entry of at least one flow table portion among the plurality of load balancer nodes. A synchronization protocol can be executed to restore the entry to each of the load balancer nodes in the node chain.

In some embodiments, the system can include a controller. The control can execute a controller protocol to confirm that each of the load balancer nodes in the node chain are synchronized after the node chain is reconfigured.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1A:
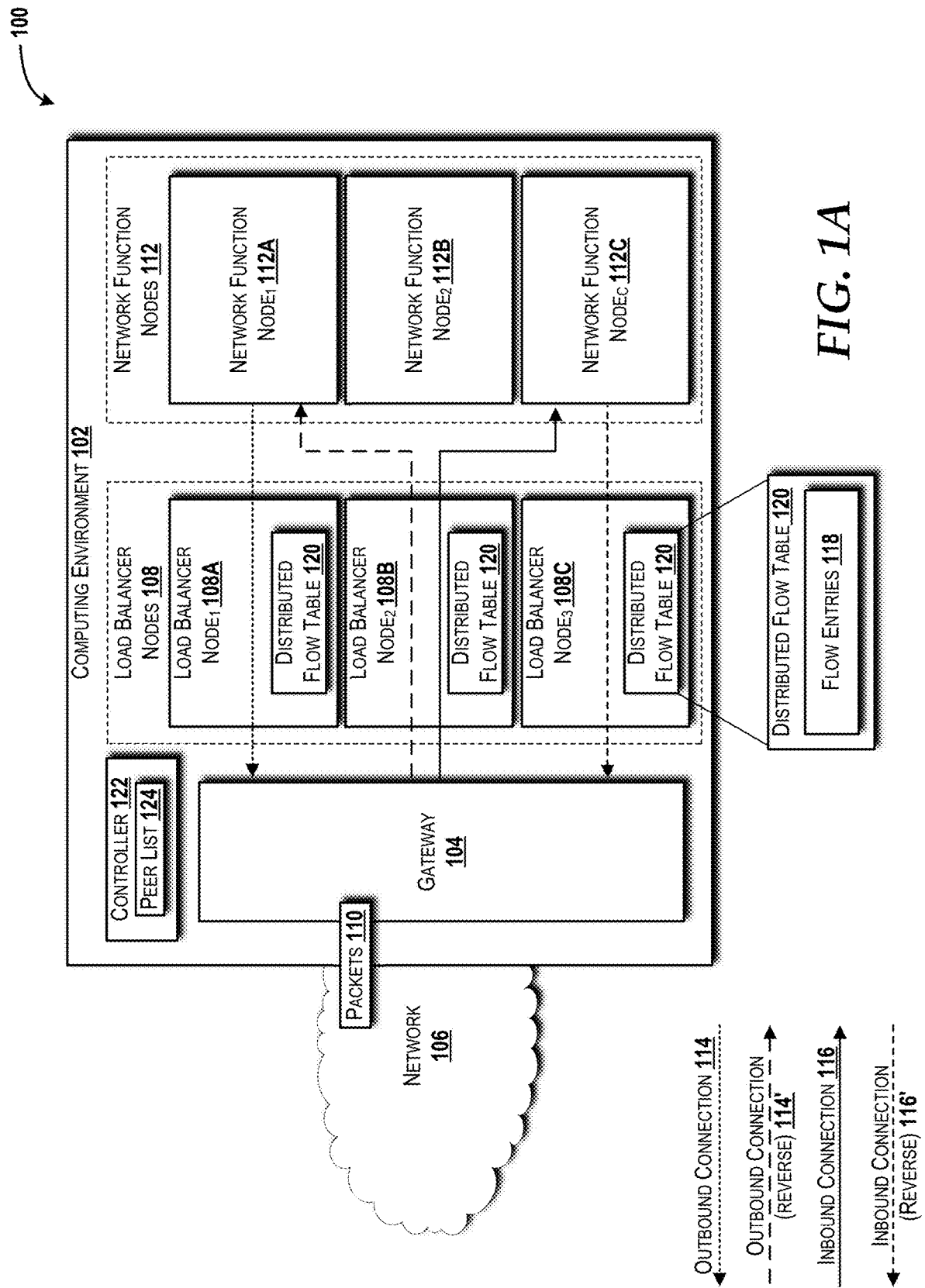
FIG. 1A is a diagram illustrating aspects of an illustrative operating environment in which various embodiments of the concepts and technologies described herein can be implemented.

Stateful network functions need to support high state and line rate forwarding performance at low latency. State management operations performed by stateful network functions are likely to grow even more challenging because Internet-connected devices are expected to grow to several tens of billions over the next decade. Hence, a technical requirement for future scaling of stateful network functions is a massive, high-performance flow table that supports several hundred million entries.

Large flow tables are more practical to implement in software than in hardware because $100s$ of gigabytes ("GB") of random access memory ("RAM") can be utilized by software. In comparison, a state-of-the-art hardware switch supports just 100 megabytes ("MB") of static RAM ("SRAM"). However, software-based network functions have relatively low per-node forwarding performance of tens of gigabits per second ("Gbps"), which necessitates a scale-out deployment of stateful network functions and constituent flow tables. A scale-out design brings forth the need to support seamless elasticity as well as fault tolerance of nodes.

For an ISP's network cloud, the concepts and technologies disclosed herein provide an implementation of one such network function—a stateful layer 4 ("L4") load balancer. A first category of previous efforts consists of cloud L4 load balancing schemes, which seek to maintain connection affinity via local packet forwarding. Previous schemes in this category fail to meet the affinity requirements of an ISP's network cloud, especially during failures and concurrent elastic scaling of load balancers and network functions. A second category of previous efforts consists of schemes for distributed state management in network functions on top of which L4 load balancers can be built. While these schemes can meet either elasticity requirements, fault-tolerance requirements, or both, most of these systems demonstrate scenarios with fewer than 10K flows, and hence their scalability even to a million flows is largely untested.

The concepts and technologies disclosed herein provide a new load balancer node that meets all of the above goals for an ISP's network cloud. The disclosed load balancer node can guarantee affinity for connections originating towards a network function (inbound connections) or from the network function (outbound connections) despite concurrent changes in the set of load balancer and network function nodes. The disclosed load balancer node can tolerate a configurable number of failures at a cost that is in proportion to the number of failed replicas. Elastic scaling of its nodes linearly increases the forwarding throughput as well as the flow table size. Finally, the disclosed load balancer node can provide low, predictable per-packet latency commensurate with the hardware capability (e.g., up to tens of microseconds on commodity servers and network interface controllers ("NICs")), a throughput of several million packets per second per core, and a flow table that can scale up to the allocated memory at a server. These capabilities make it useful for deployment in an ISP's network cloud as a front-end load balancer to safely connect stateless network devices such as hardware routers to stateful network functions.

A principle in the design of the disclosed load balancer node is to integrate forwarding with replication, unlike the above-described efforts that separate local packet forwarding from distributed state management. A packet, along with some replication metadata, can be forwarded along the load balancer nodes where its connection state is to be replicated. At each load balancer node, the packet can be read from the incoming queue, processed locally at a predictable computation cost and latency, and forwarded to the next load balancer node. This concept of chain replication is applied herein to enable flow table replication in software data planes while maintaining high-performance run-to-completion packet processing at individual nodes.

The concepts and technologies disclosed herein extend prior work on chain replication in at least three ways by leveraging the fact that a flow entry does not need to change the network function assigned to a connection during its lifetime. First, the concepts and technologies disclosed herein show that fully replicated entries can be safely cached without violating affinity. Second, the concepts and technologies disclosed herein enable arbitrary chain reconfigurations (e.g., node additions and removals) in a completely non-blocking manner. Prior work (e.g., NetChain) blocks writes and reads to avoid inconsistent entries during reconfigurations. However, the concepts and technologies disclosed herein allow inconsistencies to occur during query processing and utilize the disclosed protocol to correct any inconsistencies as long as a single common node exists with the previous chain. Third, the concepts and technologies disclosed herein relax the reliable first-in-first-out ("FIFO") channel assumption in the chain replication protocol to reduce the overhead of the TCP stack during query processing.

To briefly summarize, the concepts and technologies disclosed herein outline the requirements of a network cloud load balancer including inbound and outbound affinity. The concepts and technologies disclosed herein show that an unreplicated distributed flow table with flow caching can ensure affinity with a small performance impact. The concepts and technologies disclosed herein present a new chain replication protocol to replicate L4 load balancer flow tables. The concepts and technologies disclosed herein support a completely non-blocking chain reconfiguration by means of state synchronization operations that are computed and orchestrated by a controller.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1A, aspects of an operating environment 100 in which various embodiments of the concepts and technologies disclosed herein can be implemented will be described. The operating environment 100 shown in FIG. 1A can include a computing environment 102. In some embodiments, the computing environment 102 is an ISP's network cloud datacenter. The computing environment 102 can include a stateless gateway router ("gateway") 104 that connects to a network 106.

The gateway 104 can route incoming traffic from the network 106 to a set of L4 load balancer nodes 108 (hereafter, at times, referred to collectively as "load balancer nodes 108" or individually as "load balancer node 108"), such as three load balancer nodes 108A-108C in the illustrated example. The traffic can include packetized data shown as packets 110. As is generally understood, packets 110 can include headers that can identify, inter alia, the source IP address, the destination IP address, the source port, the destination port, and the protocol associated with the packet 110, collectively referred to as a 5-tuple. The gateway 104 can implement an equal-cost multipath ("ECMP") network routing strategy to route traffic among the load balancer nodes 108 based upon a unique connection key (e.g., a hash value of the 5-tuple obtained from the header of an incoming packet 110). The gateway 104 can also route outgoing traffic received from the load balancer nodes 108 to the network 106. The load balancer nodes 108 can send traffic to a set of stateful network function nodes 112 (hereafter, at times, referred to collectively as "network function nodes 112" or individually as "network function node 112"), such as three network function nodes 112A-112C in the illustrated example. The network function nodes 112 can be implemented, for example, as network address translation ("NAT") devices, proxy devices, other network functions, or any combination thereof. The network function nodes 112 are not fixed and can be changed according to input traffic and/or scaling policies. It should be understood that this example is illustrative, and therefore should not be construed as being limiting in any way.

A connection can be uniquely identified by a 5-tuple. New connections (i.e., packets 110 with a unique 5-tuple) may be initiated from the network function nodes 112 directed towards the network 106. These connections are referred to herein as outbound connections 114. New connections may be initiated from the network 106 directed towards the network function nodes 112. These connections are referred to herein as inbound connections 116. Once initiated, a connection may send traffic in both directions. In the illustrated example, the reverse directions are shown as outbound connection (reverse) 114' and inbound connection (reverse) 116'. The network function nodes 112 require connection affinity. That is, all packets 110 in a connection in both directions should be processed by the same network function node 112. Failure to do so can result in the connection being dropped and can cause significant user-visible disruptions.

The load balancer nodes 108 can provide outbound connection affinity. If an outbound connection 114 is initiated by a network function node 112 directed towards the network 106, all packets 110 in the reverse flow, via the outbound connection (reverse) 114', should be routed to the same network function node 112. The load balancer nodes 108 can provide inbound connection affinity. If an inbound connection 116 is initiated by the network 106 directed towards a network function node 112, all subsequent packets 110 should be routed to the same network function node 112. The load balancer nodes 108 can provide a high forwarding throughput in terms of packets per second (e.g., on the scale of mega packets per second "Mpps"). The computing environment 102 can support a linear increase in the number of connections and forwarding throughput by increasing the number of load balancer nodes 108. This is referred to herein as horizontal scaling. The computing environment 102 can support reconfigurability so that a planned increase or unplanned failures in the number of load balancer nodes 108 up to a configured number of replicas should not interrupt packet processing or violate connection affinity.

The load balancer nodes 108 can maintain flow entries 118 in a distributed flow table 120. The distributed flow table 120 enables the load balancer nodes 108 to create or read any flow entry 118. In this manner, the load balancer nodes 108 can maintain inbound and outbound connection affinity.

Figure 1B:
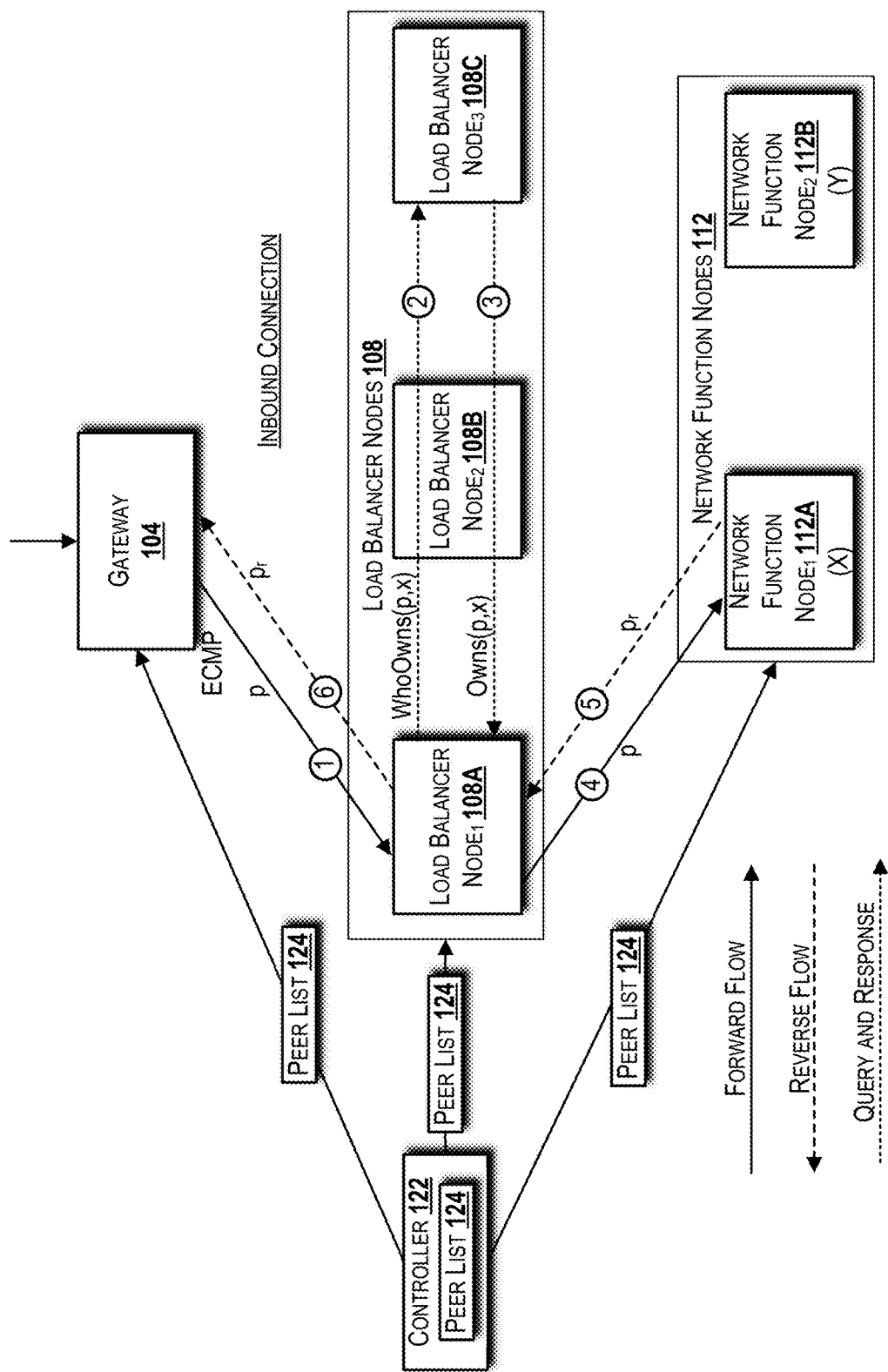
FIGS. 1B-1E are diagrams illustrating aspects of example deployments of load balancer nodes as load balancing elements between a stateless gateway and a changing set of stateful network function nodes, according to illustrative embodiments of the concepts and technologies disclosed herein.

FIGS. 1B-1E are diagrams illustrating aspects of example deployments of load balancer nodes as load balancing elements between a stateless gateway (e.g., the gateway 104) and a changing set of stateful network function nodes (e.g., the network function nodes 112) as will be described, according to illustrative embodiments of the concepts and technologies disclosed herein. Turning first to FIG. 1B, an inbound connection will be described. The illustrated example includes the gateway 104, the load balancer nodes 108A-108C, and the network function nodes 112A-112B (shown also as X and Y). A load balancer node 108 can forward traffic, such as included in the packet 110 (shown asp) to any of the network function nodes 112, but a network function node 112 can select one of the load balancer nodes 108 as its default gateway to transmit all of its traffic. If the selected load balancer node 108 fails, the network function node 112 can update the default gateway to a different load balancer node 108. A controller 122 can maintain a load balancer peer list ("peer list") 124 including all current load balancer nodes 108 in deployment, such as the load balancer nodes 108A-108C in the illustrated deployment. The controller 122 can communicate the peer list 124 to the gateway 104, the load balancer nodes 108, and the network function nodes 112.

The load balancer nodes 108 can implement the flow table 120 (best shown in FIG. 1A) amongst each other to store a connection state. The flow table 120 can provide an asynchronous call WhoOwns (p,nf), wherein p is the packet 110 and nf is an identifier of the network function node 112 proposed to handle this connection. If the flow table 120 does not have a flow entry 118 corresponding to the connection represented by p, the network function node 112 identified by nf is selected to be the processing node for this connection and a response Owns(p, nf) is returned to the calling node. If the flow table 120 has already stored nf' to be the processing node for this connection, a response Owns(p,nf) is returned to the calling node. Executing WhoOwns may transmit queries to other nodes. The load balancer nodes 108, however, can cache responses so that repeated WhoOwns queries for the same connection can return the cached value.

In the case of an inbound connection as shown in FIG. 1B, the gateway 104 can send (shown as step 1) the first packet 110 (shown asp) of a new connection to the load balancer node₁ 108A based on a hash value of the 5-tuple in the header of the packet 110. The load balancer₁ 108A can, in turn, generate a WhoOwns query to the flow table 120 to find that a flow entry 118 does not yet exist for this connection. Since a flow entry 118 may still exist for this connection at another load balancer node 108, the WhoOwns query can be sent (shown as step 2) to the load balancer node₃ 108C after selecting the network function node₁ 112A (also shown as X) as the owner. Upon receiving an Owns reply (shown as step 3), the flow entry 118 in the flow table 120 at the load balancer node₁ 108A and the packet 110 included in the Owns reply can be forwarded (shown as step 4) to the network function node₁ 112A. It should be understood that subsequent packets in the forward direction do not require a distributed query to the load balancer node₃ 108C and can be directly forwarded to the network function node₁ 112A. Packets 110 in the reverse flow (shown as step 5) for this connection from the network function node₁ 112A reach the load balancer node₁ 108A because the load balancer node₁ 108A is configured as the default gateway for the network function node₁ 112A. The load balancer nodes 108 associate the reverse flow to the forward flow from the flow entry 118 in the flow table 120 and forwards (shown as step 6) the traffic to the gateway 104.

Figure 1C:
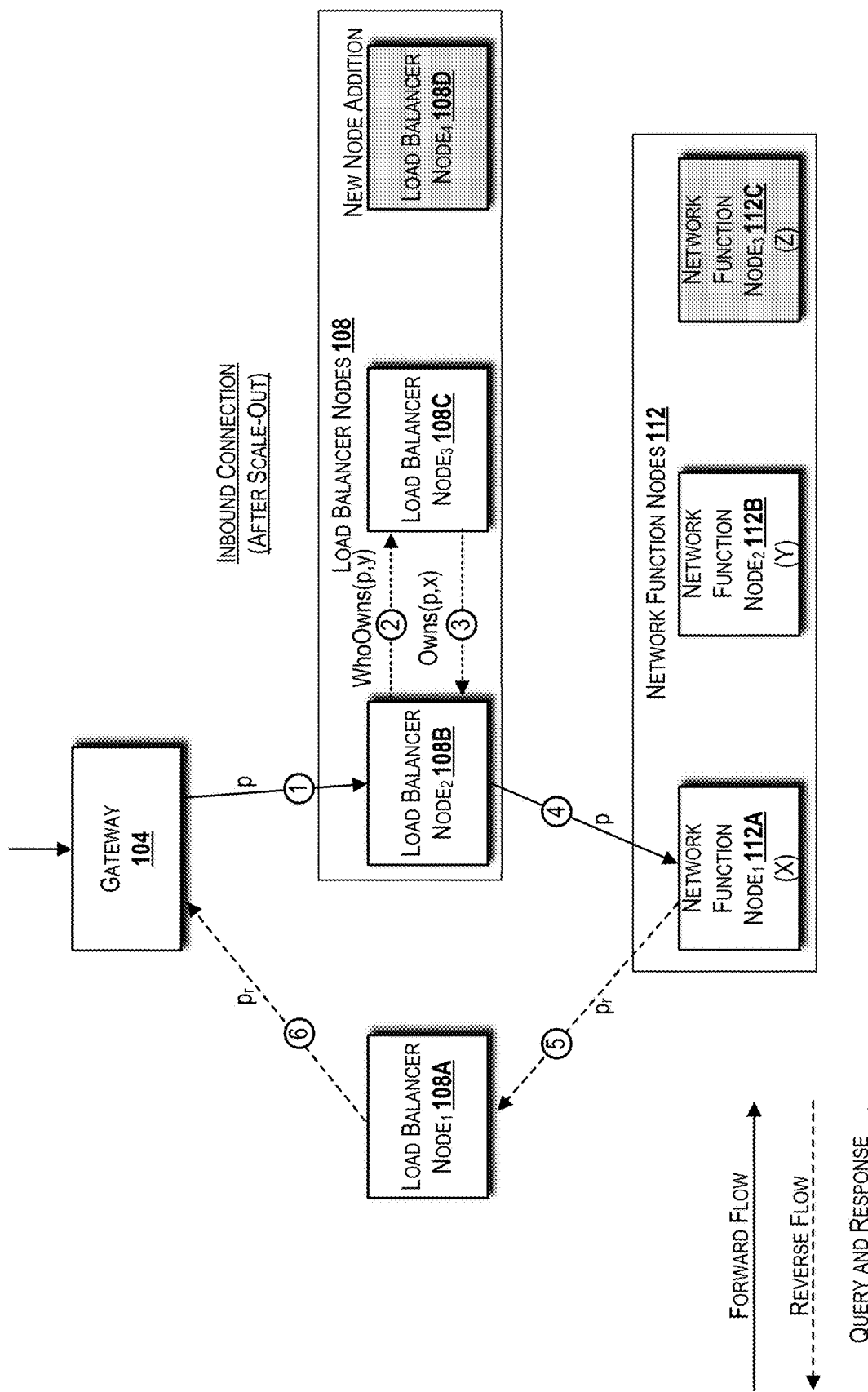

Referring now to FIG. 1C, the case of an inbound connection after a scale-out event will be described. A scale-out event can cause a forward flow of an existing inbound connection (such as described in FIG. 1B) to be routed to a different load balancer node 108. In the illustrated example, the load balancer node₂ 108B can receive (shown as step 1) the packet 110 (instead of the load balancer node₁ 108A in FIG. 1B) after the addition of the load balancer node₄ 108D. The load balancer node₂ 108B can query (shown as step 2) the flow table 120 to obtain (shown as step 3) the of associated with the network function node 112 to which the packet 110 should be routed. The load balancer node₂ 108B can then send (shown as step 4) the packet 110 to the correct network function node₁ 112A (X). The load balancer node₂ 108B can also cache the flow entry 118 locally to avoid distributed queries for subsequent packets 110. It should be understood that the route for the reverse flow from the network function node₁ 112A is unchanged (shown as step 5), and the reverse flow is routed via the load balancer node₁ 108A to the gateway 104 (shown as step 6).

Figure 1D:
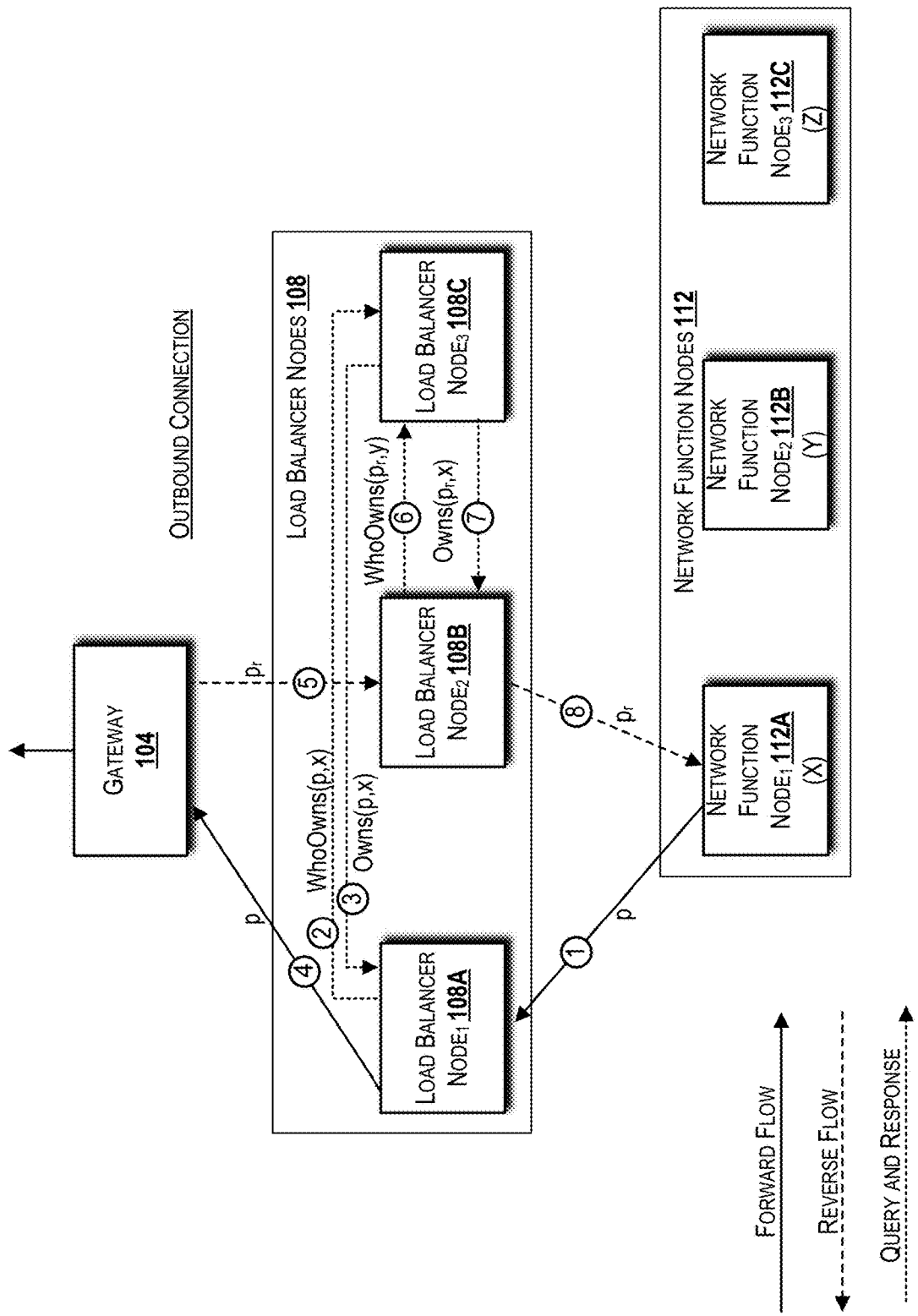

Referring now to FIG. 1D, the case of an outbound connection will be described. An outbound connection from the network function node₁ 112A (X) can be routed (shown as step 1) via the load balancer node₁ 108A, which is configured as the default gateway of the network function node₁ 112A (X). The first packet 110 of this connection can cause the load balancer node₁ 108A to create a new flow entry 118 storing the network function node₁ 112A (X) as the owner for this connection. The load balancer node₁ 108A can send (shown as step 2) a WhoOwns query to the load balancer node₃ 108C, where the load balancer node₃ 108C ascertains that the connection is indeed a new connection and inserts the new flow entry 118 into the flow table 120. The load balancer node₃ 108C can send (shown as step 3) an Owns reply to the load balancer node₁ 108A, which then forwards (shown as step 4) the packet 110 contained in the Owns reply to the gateway 104.

The reverse flow of an outbound connection can be equally likely to be sent to any of the load balancer nodes 108 due to ECMP routing performed by the gateway 104. As shown in FIG. 1D, if the load balancer node₂ 108B or another load balancer node 108 that is different from the load balancer node₁ 108A that handled the forward flow receives the $p_r$ from the gateway 104, the load balancer node₂ 108B (i.e., the different load balancer node) can send (shown as step 6) a WhoOwns query to the load balancer node₃ 108C to obtain, in an Owns reply (shown as step 7) the nf, and then sends the packet 110 to the correct network function node 112, which is the network function node₁ 112A in the illustrated example. Again, responses can be cached locally to avoid distributed queries for subsequent packets 110.

The computing environment 102 can implement a replication protocol that enables a completely non-blocking reconfiguration of an ensemble of node chains on a consistent hashing ring. The replication protocol can integrate forwarding with replication using chain replication, which enables run-to-completion packet processing at each load balancer node 108. An example application of chain replication will now be described with reference to FIG. 1E.

Figure 1E:
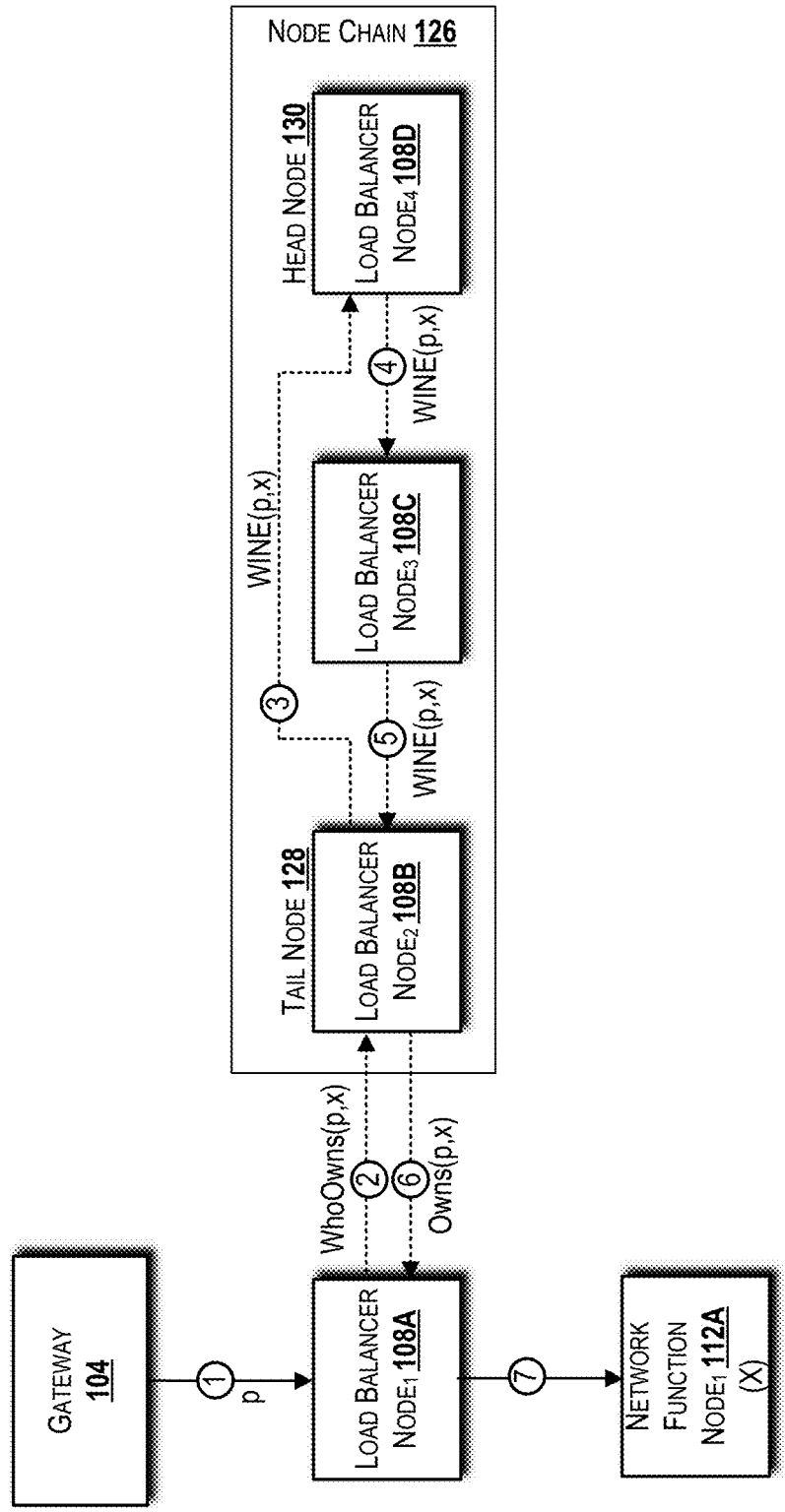

Referring now to FIG. 1E, the load balancer node₁ 108A is shown in communication with a node chain 126 that includes the load balancer nodes 108B-108D, wherein the load balancer node₂ 108B is a tail node 128 of the node chain 126 and the load balancer node₄ 108D is a head node 130 of the node chain 126. It should be understood that although three load balancer nodes 108 are shown in the example node chain 126, the node chain 126 may instead include two or more load balancer nodes 108. As such, the illustrated example should not be construed as being limiting in any way.

In the example illustrated in FIG. 1E, the load balancer node₁ 108A receives (shown as step 1) a packet p 110 from the gateway 104. The load balancer node₁ 108A, in response, sends (shown as step 2) a WhoOwns query to the tail node 128, which is the load balancer node₂ 108B in the illustrated node chain 126. The tail node 128, in turn, returns the next hop network function node if an entry exists for the connection. Otherwise, such as in the illustrated example, the tail node 128 initiates (shown as step 3) an insert request (shown as WriteIfNotExists or "WINE") for the connection via the head node 130. The new flow entry 118 can be added and then written (shown as steps 4 and 5) into the flow table 120 at all the load balancer nodes 108 in the node chain 126, including the tail node 128. The tail node 128 then forwards (shown as step 6) an Owns response to the sending load balancer node 108 (i.e., the load balancer node₁ 108A in the illustrated example), which then sends the packet 110 to the next hop network function node (i.e., the network function node₁ 112A (X) in the illustrated example).

Chain replication can be horizontally scaled by creating multiple node chain 126 instances and assigning parts of a keyspace to the node chains 126 using consistent hashing. This poses a challenge to reconfigure node chains 126 upon failure, such as the addition or removal of nodes while providing consistent results. While similar problems have been addressed in other work, such as Netchain and FAWN, both of these systems block writes and sometimes reads in order to synchronize state to new nodes. Since blocking reconfigurations may cause disruptions in a production network, the disclosed non-blocking reconfiguration protocol for load balancer nodes addresses the following challenges.

One challenge is divergent views of a peer list 124. A peer list 124 can be determined by the controller 122 and then propagated to all load balancer nodes 108 in the system (e.g., as shown in FIG. 1B). In this time window, the load balancer nodes 108 can have divergent views of the peer list 124. As a result, the load balancer nodes 108 can incorrectly compute the head node 130 or the tail node 128 for a key associated with a particular connection, and thereby can make incorrect forwarding and replication decisions. The disclosed non-blocking reconfiguration protocol addresses this challenge.

Another challenge is supporting concurrent chain reconfigurations. Node chains 126 should support concurrent reconfigurations at arbitrary positions in the node chain 126, such as, for example, a reconfiguration to insert a new node at the second chain node and another reconfiguration to remove the fourth chain node. To do so, a node chain 126 should correct any inconsistent or missing entries at its nodes as a result of these changes. The disclosed non-blocking reconfiguration protocol addresses this challenge.

The disclosed non-blocking reconfiguration protocol also addresses the challenge of cross-chain operations. The number of unique node chains 126 in the system is equal to the number of nodes. Hence, the addition (or removal) of a node adds (or removes) one more chains to (or from) the system. These reconfiguration events may require cross-chain operations including, for example, splitting and merging of node chains 126 without violating the affinity or fault tolerance goals of the system.

Figure 1F:
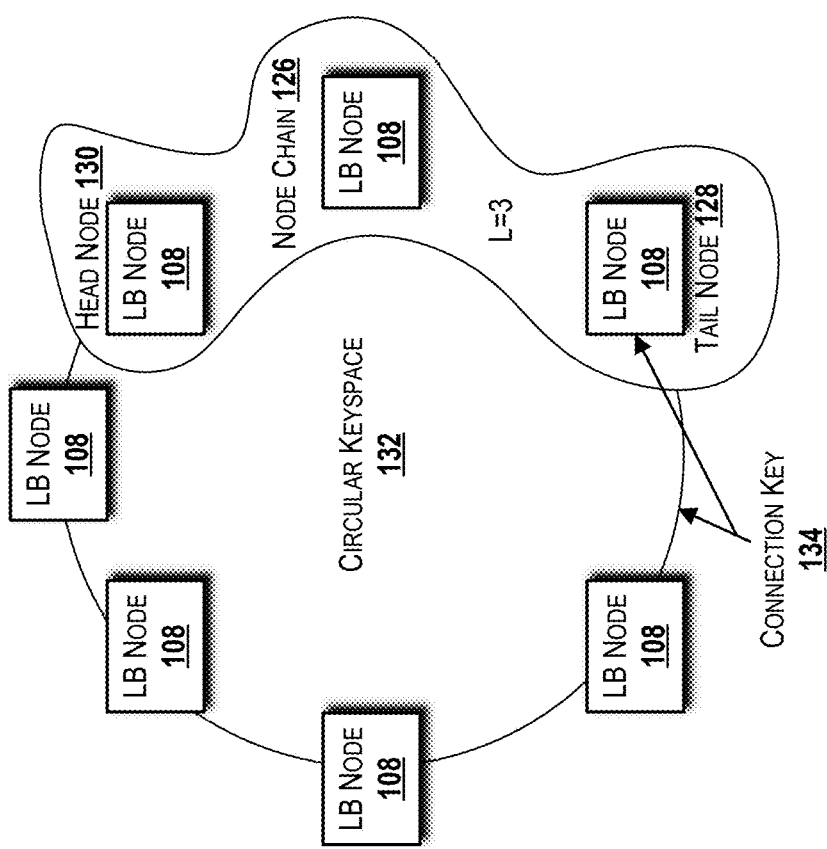
FIG. 1F is a diagram illustrating an example circular keyspace, according to an illustrative embodiment of the concepts and technologies disclosed herein.

Turning now to FIG. 1F, a diagram of an example circular keyspace 132 will be described, according to an illustrative embodiment of the concepts and technologies disclosed herein. The chain nodes (shown as load balancer nodes 108) that store a flow entry 118 can be computed based upon three parameters: a unique connection key 134 derived from the 5-tuple of each packet header, the node ID of load balancer nodes 108, and the length L of the node chain 126. The tail node 128 of a node chain 126 can be computed by mapping the connection key (5-tuple) to the circular keyspace 132 and subsequently to a load balancer node 108 using a consistent hash function. The head node 130 of the node chain 126 is node (L−1)—that is, the predecessor of the tail node 128 on the circular keyspace 132. A flow entry 118 may additionally be cached at other load balancer nodes 108 that are forwarding packets 110 associated with that connection. The controller 122 can assign unique node IDs to load balancer nodes 108 and unique version IDs to node peer lists 124 upon each reconfiguration event (e.g., node additions or removals). The controller 122 can execute a reconfiguration in two phases. First, the controller 122 can send the new peer list 124 to all load balancer nodes 108, the network function nodes 112, and the gateway 104. Second, the controller 122 can initiate a set of sync operations so that flow entries 118 for all connection keys 134 can be replicated at the corresponding chain nodes. If all the synchronizations complete before further reconfigurations occur, the current version ID can be marked as synced.

Figure 1G:
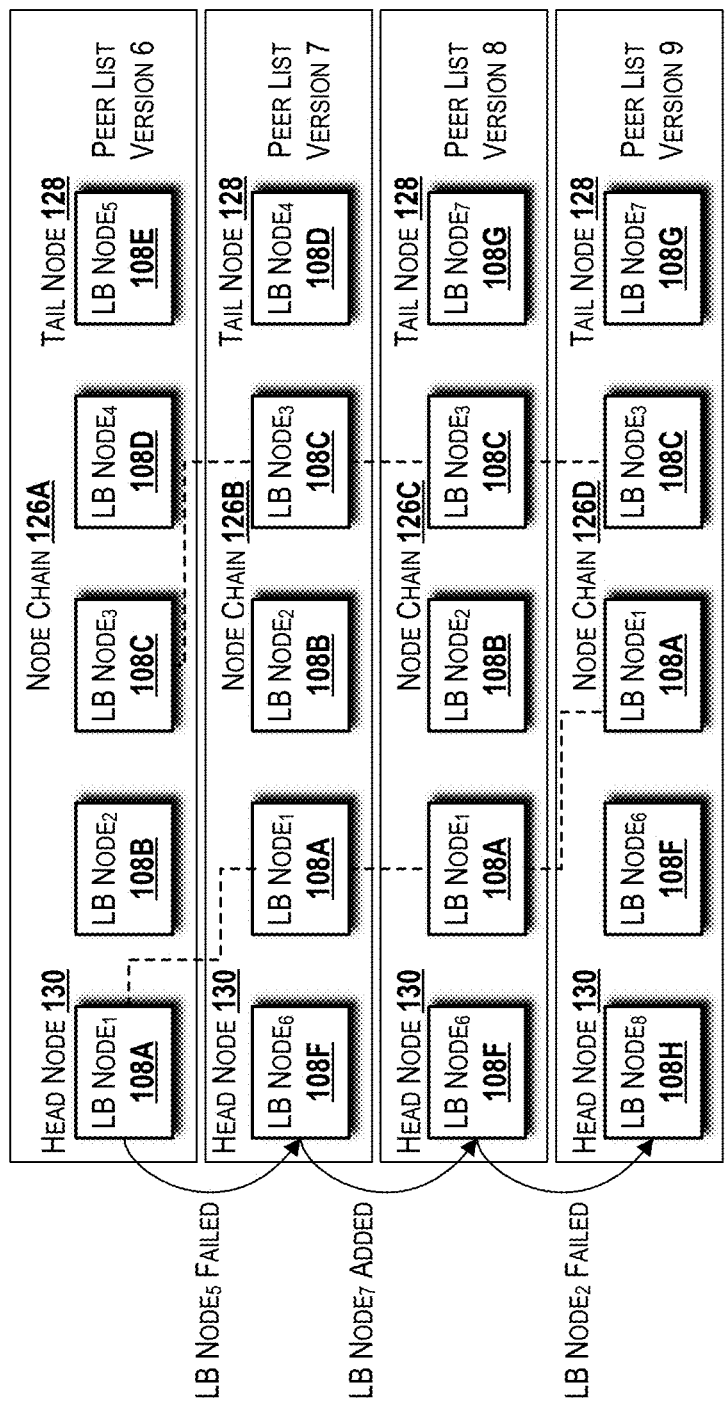
FIG. 1G is a diagram illustrating an example of identifying common nodes for a node chain across multiple peer list versions, according to an illustrative embodiment of the concepts and technologies disclosed herein.

The sync operation is subject to the existence of a first common node for a given node chain 126. In FIG. 1G, a list of node chains 126A-126D for a connection key 134 across all peer list 124 versions starting from the last synced version (shown as version 6) up to the current version (shown as version 9) is shown. The first common node can be defined as the first node in the first node chain (starting from the head node 130) that is present in every subsequent chain in the peer list 124. By this definition, the load balancer node₁ 108A is the first common node in the illustrated example.

The load balancer nodes 108 can adhere to the following assumptions. (1) Keep-alive: A connection can successfully transmit a packet once every keep-alive interval (e.g., on the order of minutes). (2) Reconfiguration: From one synced version of the peer list 124 to a next synced version of the peer list 124, there exists a first common node for any connection key 134 in the system. For example, a failure of all but one load balancer node 108 in a node chain 126 is permissible as long as there is enough time for the system to reach a synced version. (3) Failure: The load balancer nodes 108 can follow crash failure semantics, where the controller 122 is unable to reliably detect whether a load balancer node 108 has failed. The controller 122 can log its execution state persistently. Upon a failure, the controller 122 eventually restarts and recovers its execution state. (4) Memory: A local flow table 120 associated with a load balancer node 108 should have sufficient capacity to store all the chain entries assigned to it. If a load balancer node 108 is running out of space in its table, the controller 122 can trigger a scale-out action to reduce the entries assigned to that load balancer node 108.

The distributed flow table 120 design described herein can be implemented using three protocols. A query protocol can implement the WhoOwns and Delete queries. A sync protocol can define the operation of load balancer nodes 108 in response to reconfigurations. A controller protocol can define the actions of the controller 122 to maintain peer lists 124 and to orchestrate sync operations.

The query protocol will now be described. Unlike the other two protocols, the query protocol does not assume that its messages are sent over reliable first-in-first-out ("FIFO") channels, which further simplifies its implementation. The query protocol supports inserting a flow entry 118. The tail node 128 of a given node chain 126 starts insertion with the message WriteIfNotExists (shown as WINE in FIG. 1E) to the head node. WriteIfNotExists is forwarded through the node chain 126 to the tail node 128, which sends the response to the fwdNode. If WriteIfNotExists executes successfully at the tail node 128, the flow entry 118 at the tail node 128 can be safely cached. For subsequent WhoOwns queries for this connection, the system is expected to always return the nf ID stored at the tail node 128. Moreover, the system guards against using an entry at a non-tail node to forward packets 110. This is accomplished by adding a single cacheable bit to each flow entry 118. This bit is set to 1 in the flow entry 118 stored at the tail node 128 or if the flow entry 118 is obtained from the tail node 128 in response to a WhoOwns query. Otherwise, this bit is set to 0 at other load balancer nodes 108, implying that those flow entries 118 cannot be used to forward packets 110. The system treats flow entries 118 as soft states to handle deletion.

Deletion can be implemented using periodic scans of the flow table 120 at each node at equal-length deletion intervals, which is a fraction of the keep-alive interval for the system. Each load balancer node 108 can independently maintain counter c, which represents the current period. Each flow entry 118 at a load balancer node 108 can also keep a counter, which represents the period when this flow entry 118 was last used. A flow entry 118 can be deleted if it was last used at least one keep-alive interval ago.

The last used cycle for a flow entry 118 at chain and other nodes can be updated as follows. When a load balancer node 108 receives an external packet 110, the load balancer node 108 can check if the counter in the local flow entry 118 (if any) matches the current period. If the local flow entry 118 was last used in a previous period, the packet 110 can be forwarded through its chain as if it is the first packet 110 of a flow. This allows the load balancer nodes 108 in a node chain 126 to update flow table entries upon arrival of packets 110 every keep-alive interval. To ensure that last used counters are updated at least once every keep-alive interval, the deletion interval can be set to half of the keep-alive interval or lower.

Figure 1H:
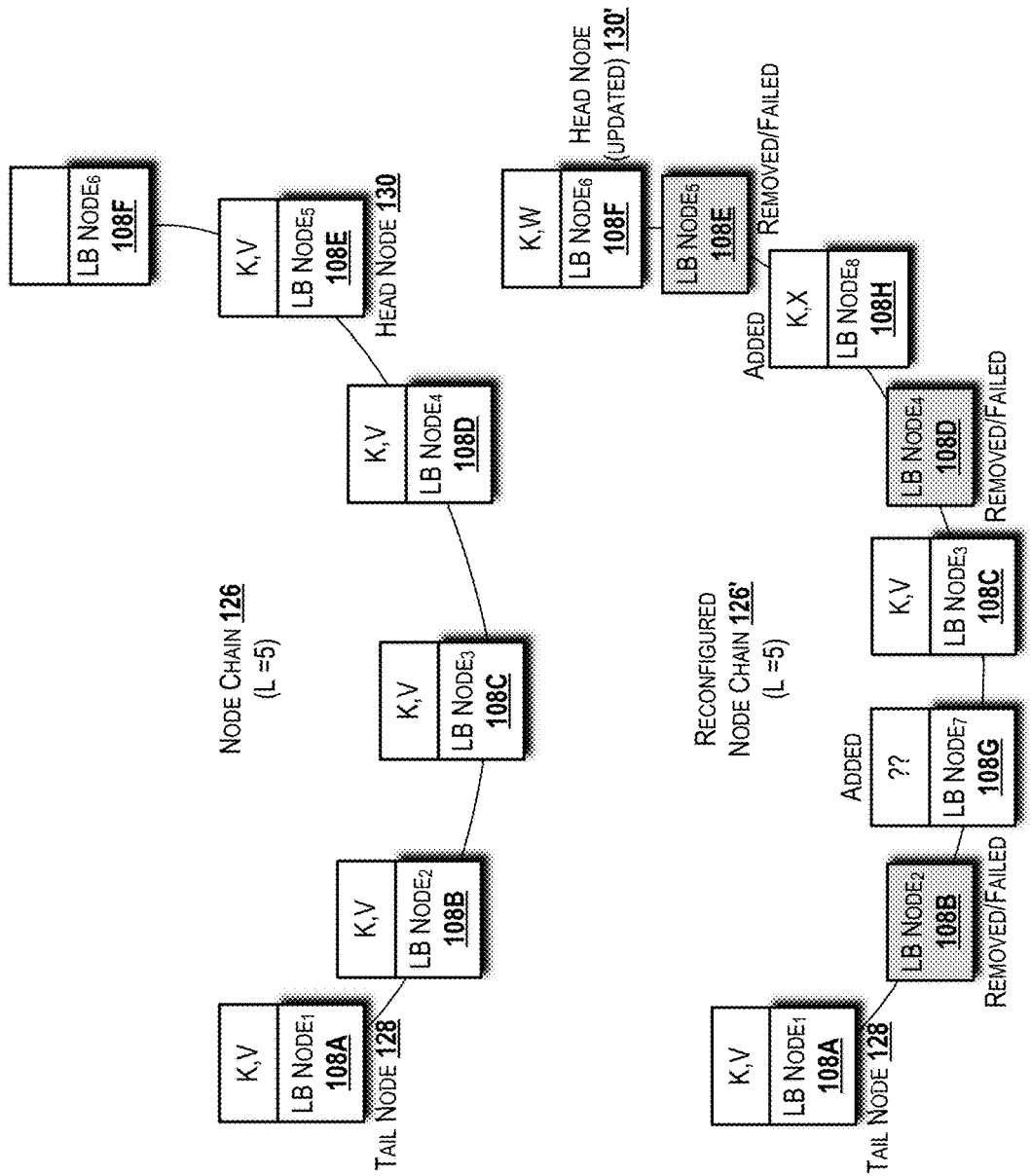
FIG. 1H is a diagram illustrating an example reconfiguration and how the reconfiguration can affect the data at chain nodes, according to an illustrative embodiment of the concepts and technologies disclosed herein.

The sync protocol will now be described. The sync protocol transfers state to new chain nodes and corrects data inconsistencies due to reconfigurations. FIG. 1H illustrates an example reconfiguration and how the reconfiguration can affect the data at chain nodes. Prior to reconfiguration, all L (=5) chain nodes have the same nf ID "v" for the connection key "k". During a sequence of reconfigurations, the load balancer node$_2$ 108B, the load balancer node$_4$ 108D, and the load balancer nodes 108E from the original node chain 126 either failed or were removed (grayed out in FIG. 1H). Two new load balancer nodes—load balancer node$_7$ 108G and load balancer node$_8$ 108H—have joined the reconfigured node chain 126'. An existing load balancer node$_6$ 108F became the new head node 130' of the reconfigured node chain 126'. After these changes, the load balancer node$_7$ 108G is missing an entry for the key "k". More problematically, the load balancer node$_6$ 108F and the load balancer nodes 10811 have nf IDs ("x") and ("w"), respectively, that are different from the original nf ID ("v"). Such inconsistencies can arise since these load balancer nodes 108 did not have any flow entry 118 for the connection key and hence accepted the values proposed in the WriteIfNotExists queries. The task of the sync protocol is to restore the entry (k,v) at all chain nodes.

The sync process is initiated by a message sync(syncId, kLow, kHigh) from the controller 122 to the load balancer node 108. SyncID can be assigned by the controller 122 to uniquely identify this sync operation from others. All keys in the range kLow (exclusive), kHigh (inclusive) were part of the same chains in all reconfigurations since the last synced version ID. Further, this load balancer node 108 is the first common node in all of those node chains 126. In the above example, the third node in the node chain 126 is the first common node. The first common node responds to the sync message by broadcasting all flow entries 118 in its flow table 120 in this key range to all other chain nodes. The recipient chain nodes insert these flow entries 118 in their flow tables 120 overwriting the existing flow entries 118 if any, and then sends an acknowledgment to the first common node. Upon receiving all acknowledgments, the first common node confirms to the controller 122 that the sync is complete. This technique, while expensive, does achieve the desired goal for the above example.

This technique does not resolve inconsistencies if the first common node does not have a flow entry for a connection. In the above example, if the first common node did not have the entry (k,v) to begin with, the first common node would not be able to resolve the conflicting (k,w) and (k,x) entries at the first two nodes. The algorithm below resolves these inconsistencies using two rounds of messages between the first common node and the nodes prior to the first common node in the chain.

(1) The first common node broadcasts flow entries in the key range (kLow, kHigh) to all other chain nodes.

(2) Chain nodes insert these entries in their flow table overriding existing entries and send acknowledgment to the first common node.

(3) Chain nodes preceding the first common node send to the first common node the set of entries in this key range that exist in their table but are not reported by the first common node.

(4) If the first common node receives an entry (k, v) and does not have an entry for k, it inserts (k, v) to its table and broadcasts (k, v) to all nodes prior to first common node. Otherwise, the first common node reads its entry (k, v') from its table and broadcasts (k, v') to all nodes prior to first common node.

(5) Nodes insert the entries received from the first common node in step (4) and send acknowledgments to the first common node.

Step (1) in the above algorithm can be optimized to significantly reduce the overhead of state broadcast by distributing this task among multiple nodes and selecting the recipient nodes carefully. In addition to the first common node, any subsequent chain node that is common to all reconfigurations of the chains participates in state transfer (e.g., the 3rd and 5th chain nodes in FIG. 1H). This group of common nodes sends their entries in the key range (kLow, kHigh) to other nodes outside the chain. A common node sends entries to the preceding nodes in the chain up to the next common node. For example, the tail node 128 can send its state to the load balancer node$_6$ 108F, and the load balancer node$_3$ 108C can send its state to the load balancer node$_1$ 108A and the load balancer node$_4$ 108D. The last common node can also send its flow entries 118 to any succeeding nodes in the node chain 126. To achieve this optimized mechanism, the controller 122 can send separate sync messages to each common node with the specific broadcast instructions.

Figure 1I:
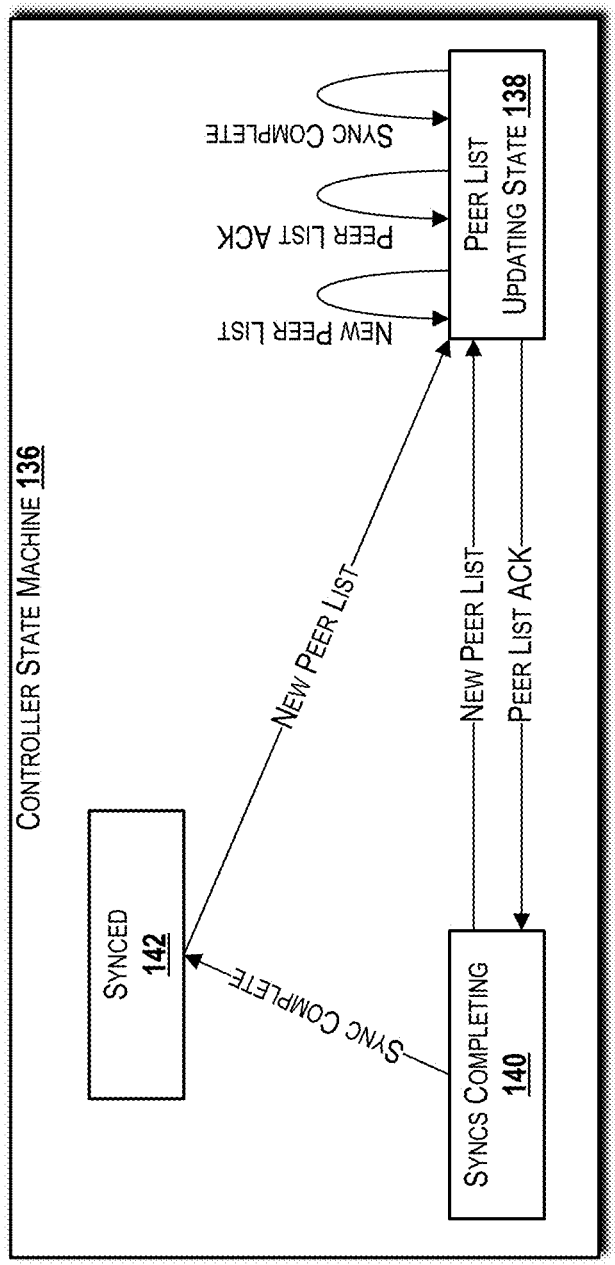
FIG. 1I is a diagram illustrating an example controller state machine that is capable of implementing a controller protocol on a controller, according to an illustrative embodiment of the concepts and technologies disclosed herein.

Turning now to FIG. 1I, an example controller state machine 136 that is capable of implementing the controller protocol on the controller 122 will be described, according to an illustrative embodiment of the concepts and technologies disclosed herein. In the illustrated example, there are three events that trigger the state machine: a reconfiguration event that causes a new peer list 124 to be generated, an acknowledgement (ACK) event from a load balancer node 108 that the load balancer node 108 has received the new peer list 124 sent by the controller 122, and a confirmation event that a sync operation is complete from the corresponding first common node.

A new peer list 124 can be determined as a result of unplanned node failures detected by the controller 122 and/or planned additions and/or removals of load balancer nodes 108 by an administrator. This event takes the controller 122 to the "peer list updating" state 138 from any other state. The first action by the controller 122 is to increment the version of the peer list 124 (see FIG. 1G for example peer list versions). The controller 122 then computes two lists of sync operations. One list describes the new sync operations as a result of the reconfiguration. The other is a list of the canceled sync operations from any previous reconfiguration that are overridden by the new sync operations. The algorithm to compute this list is described below. The controller 122 can send the new peer list 124 and the list of canceled sync IDs to the new peers.

The controller 122 remains in the same state until all new peers have acknowledged the new peer list 124. Upon that event, the controller 122 initiates the new sync operations by sending messages to the corresponding first common nodes. The controller 122 enters a "syncs completing" state 140 to wait for the completion of all ongoing syncs. The controller 122 receives confirmations of sync completions from the corresponding first common nodes. If all ongoing syncs are completed and the controller 122 is in the "syncs completing" state 140, the controller 122 enters a "synced" state 142. The controller 122 marks the current version ID as synced and informs peers of the synced version ID.

A proof of connection affinity will now be described. This proof focuses on the query and sync protocols described above. The proof is described in consideration of the time interval between one synced version of the peer list 124 to the next synced version of the peer list 124 as viewed by the controller 122. This proof explains that in any such interval for any key in the system, the following property holds true. If a WhoOwns query on a key k returns a value v, then any subsequent WhoOwns query will either not return a value or return the same value v.

The values stored with a key k at all load balancer nodes 108 in a given node chain 126 can be denoted using an L-tuple. The value at the head node 130 is at the start of the tuple and the value at the tail node 128 is at the end of the tuple. If a load balancer node 108 does not have an entry for this key, the key is represented using a 0 (read as null) in the tuple. The following three tuples are defined as good tuples. In tuple 1, no load balancer node 108 has an entry for key k. In tuple 2, a prefix of nodes all have the same value v and the remaining nodes have no entries. In a chain of length L, there are (L−1) good tuples of this type. In tuple 3, all nodes have the value v.

$$\text{Tuple1:}(0, \ldots 0). \text{Tuple2:}(v, \ldots v, 0, \ldots 0). \text{Tuple3:} (v, \ldots v)$$

In between one synced version and the next, the system undergoes three phases: a period of no reconfigurations, a period of one or more reconfigurations, and a period with no reconfigurations where the sync protocol executes and completes. If the system starts from a good tuple state at the beginning of the first phase, then the system can satisfy the aforementioned property during the three phases and can return to a good tuple state at the end of the third phase. The system can start in a tuple 1 state for key k and is at the beginning of the first phase.

If the system starts with a good tuple state and no reconfigurations occur, the aforementioned property is satisfied. In proof, the system starts with tuple 1 and v is the first value inserted at the head node 130. Then, all subsequent nodes in the node chain 126 will store no other value except v for the key k. Even if a conflicting WriteIfNotExists (k, v') is executed, the head node 130 will reject the conflicting value v' and propagate the value v to the rest of the node chain 126. Starting from a tuple 1 state, the system can only move to tuple 2 or a tuple 3 state. A similar reasoning shows that a system in tuple 2 state remains in tuple 2 state (with an increasing number of non-null values) or moves to a tuple 3 state. A system in tuple 3 state always remains in a tuple 3 state. In all cases, the value returned by the system is the initial value at the head node. Hence, the system satisfies the aforementioned property.

The system can satisfy the aforementioned property during a series of reconfigurations if (1) it was in a good tuple state right before the first reconfiguration and (2) there exists a first common node across all reconfigurations of the node chain 126. In proof, if the first common node does not have an entry, then no WhoOwns query has been executed yet, which trivially satisfies the aforementioned property. If the first common node has an entry (k, v), any subsequent nodes in the node chain 126 will have either no value for k or the same value v. Any WhoOwns query could only have returned the value v at the first common node, thereby satisfying the property.

After a series of chain reconfigurations, the sync algorithm can restore the system to one of the good tuple states if there exists a first common node across all chain reconfigurations. In proof, three cases are considered depending on the values at the first common node and the nodes prior to the first common node at the start of the sync operation. In case 1, the first common node has a value v for key k. Step 1 and Step 2 result in that value being copied to all chain nodes. The system reaches a tuple 3 state. In case 2, the first common node does not have an entry for key k but there is an entry for k at one or more nodes prior to the first common node. The first common node receives an entry for k in step 3. In step 4, the first common node accepts the first value received for key k and sends that entry to all nodes prior to it. As a result, all chain nodes up to the first common node must have the same value for the key and the system reaches tuple 2 or tuple 3 state. In case 3, no nodes have an entry for key k. Sync has no effect and the system remains in a tuple 1 state. Thus, the sync algorithm restores the system to one of the good tuple states in all cases, satisfying the aforementioned property.

FIGS. 1A-1I have been described primarily in context of distributed load balancer nodes 108. Those skilled in the art will appreciate that the concepts and technologies disclosed herein can be applied to other distributed stateful network functions. Moreover, while some elements have been described as part of groups and other elements have been described singularly, the concepts and technologies disclosed herein are extensible to implementations that require different configurations including a different number of network elements. For example, the computing environment 102, the gateway 104, the network 106, the controller 122, and the peer list 124 shown in FIG. 1A can be implemented in multiples such as two or more computing environments 102, two or more gateways 104, two or more network 106, two or more controllers 122, or some combination thereof.

Similarly, although three load balancer nodes 108 and associated distributed flow table 120 portions are shown in FIG. 1A, the computing environment 102 can support two or more load balancer nodes 108. The computing environment 102 can also support two or more network function nodes 112. Thus, the examples illustrated in FIG. 1A-1I should not be construed as being limiting in any way.

Figure 2:
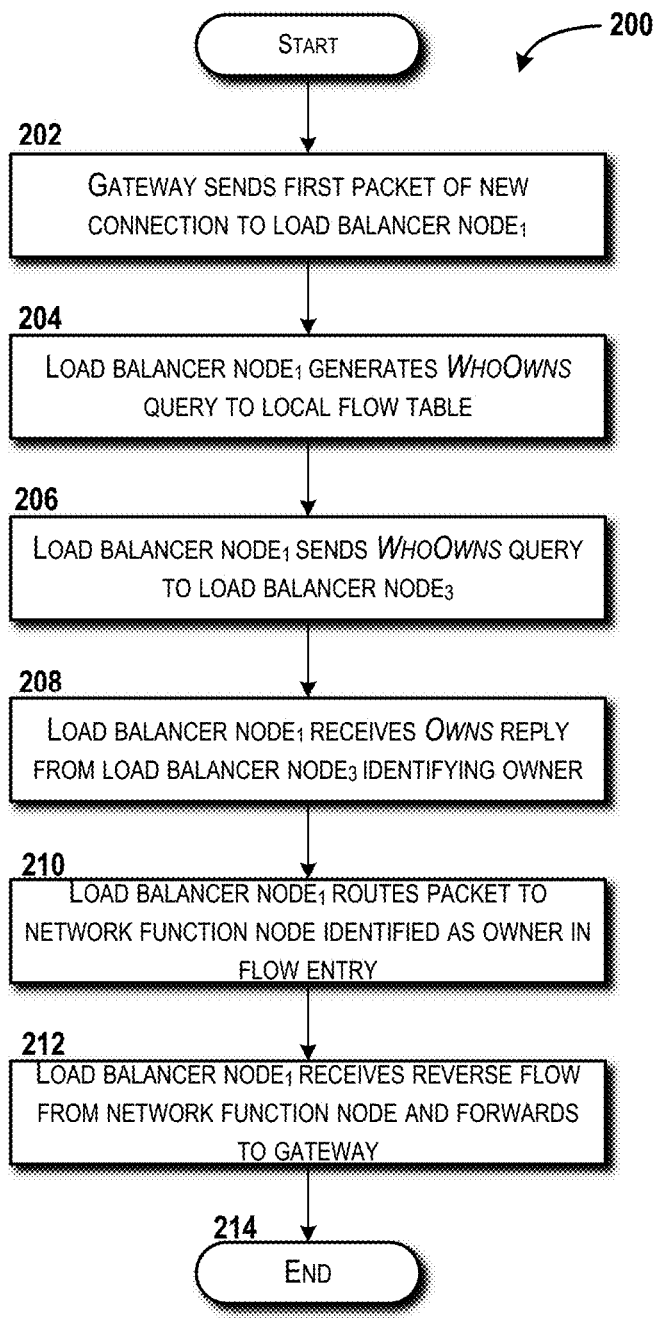
FIG. 2 is a flow diagram illustrating aspects of a method for preserving inbound connection affinity will be described in detail, according to an illustrative embodiment

Turning now to FIG. 2, aspects of a method 200 for preserving inbound connection affinity will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the computing environment 102, the gateway 104, the load balancer nodes 108, the network function nodes 112, the controller 122, or some combination thereof to perform, at least in part, one or more operations and/or causing the processor to direct other components of the computing system or device to perform one or more of the operations.

The method 200 will be described with additional reference to FIG. 1B. The method 200 begins at operation 202. At operation 202, the gateway 104 sends a first packet, such as the packet 110, of a new connection to the load balancer node$_1$ 108A based on a hash value of the 5-tuple in the header of the packet 110.

From operation 202, the method 200 proceeds to operation 204. At operation 204, the load balancer node$_1$ 108A generates a WhoOwns query directed to a local flow table, such as local portion of the distributed flow table 120 shown in FIG. 1A. The method 200 assumes that a flow entry 118 does not yet exist for this connection. From operation 204, the method 200 proceeds to operation 206. At operation 206, the load balancer node$_1$ 108A sends the WhoOwns query to the load balancer node$_3$ 108C after selecting the network function node$_1$ 112A as the owner. From operation 206, the method 200 proceeds to operation 208. At operation 208, the load balancer node$_1$ 108A receives an Owns reply from the load balancer node$_3$ 108C. From operation 208, the method 200 proceeds to operation 210. At operation 210, the load balancer node$_1$ 108A can route the flow entry 118 in the flow table 120 and the packet 110 included in the Owns reply to the network function node$_1$ 112A.

From operation 210, the method 200 proceeds to operation 212. At operation 212, the load balancer node$_1$ 108A receives reverse flow packets $p_r$ 110 from the network function node$_1$ 112A and forwards the reverse flow packets $p_r$ 110 to the gateway 104.

From operation 212, the method 200 can proceed to operation 214. The method 200 can end at operation 2114.

Figure 3:
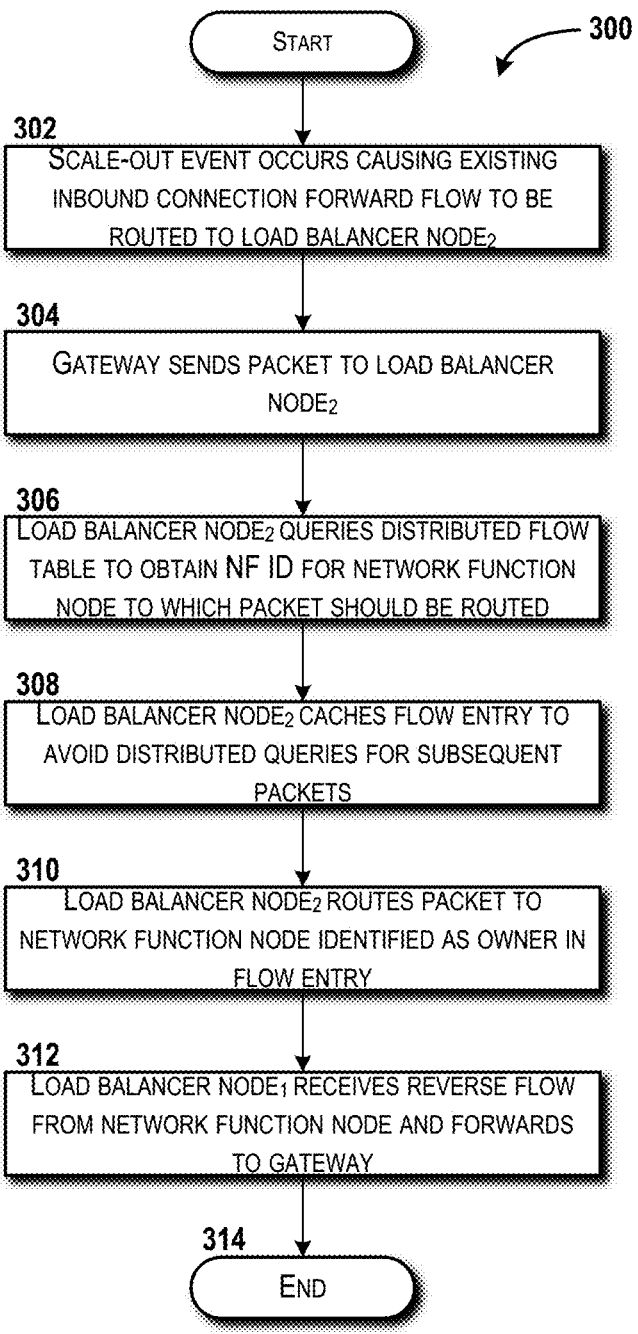
FIG. 3 is a flow diagram illustrating aspects of a method for preserving inbound connection affinity after a scale out event, according to an illustrative embodiment of the concepts and technologies described herein.

Turning now to FIG. 3, aspects of a method 300 for preserving inbound connection affinity after a scale-out event will be described, according to an illustrative embodiment of the concepts and technologies described herein. The method 300 will be described with additional reference to FIG. 1C, in which a scale-out event adds a new load balancer node$_4$ 108D and a new network function node$_3$ 112C to the computing environment 102.

The method 300 begins at operation 302. At operation 302, a scale-out event occurs causing the forward flow of an existing inbound connection (such as shown in FIG. 1B) to be routed to a different load balancer node. In the example shown in FIG. 1C, the different load balancer node 108 is the load balancer node$_2$ 108B. From operation 302, the method 300 proceeds to operation 304. At operation 304, the gateway 104 sends the packet 110 to the load balancer node$_2$ 108B.

From operation 304, the method 300 proceeds to operation 306. At operation 306, the load balancer node$_2$ 108B queries the distributed flow table 120 to obtain the NF ID for the network function node 112 to which the packet 110 should be routed. From operation 306, the method 300 proceeds to operation 308. At operation 308, the load balancer node$_2$ 108B caches the flow entry 118 locally to avoid distributed queries for subsequent packets 110. From operation 308, the method 300 proceeds to operation 310. At operation 310, the load balancer routes the packet 110 to the network function node 112 identified by the NF ID.

From operation 310, the method 300 proceeds to operation 312. At operation 312, the load balancer node$_1$ receives reverse flow packets $p_r$ 110 from the network function node 112 and forwards to the gateway 104.

From operation 312, the method 300 proceeds to operation 314. At operation 314, the method 300 can end.

Figure 4:
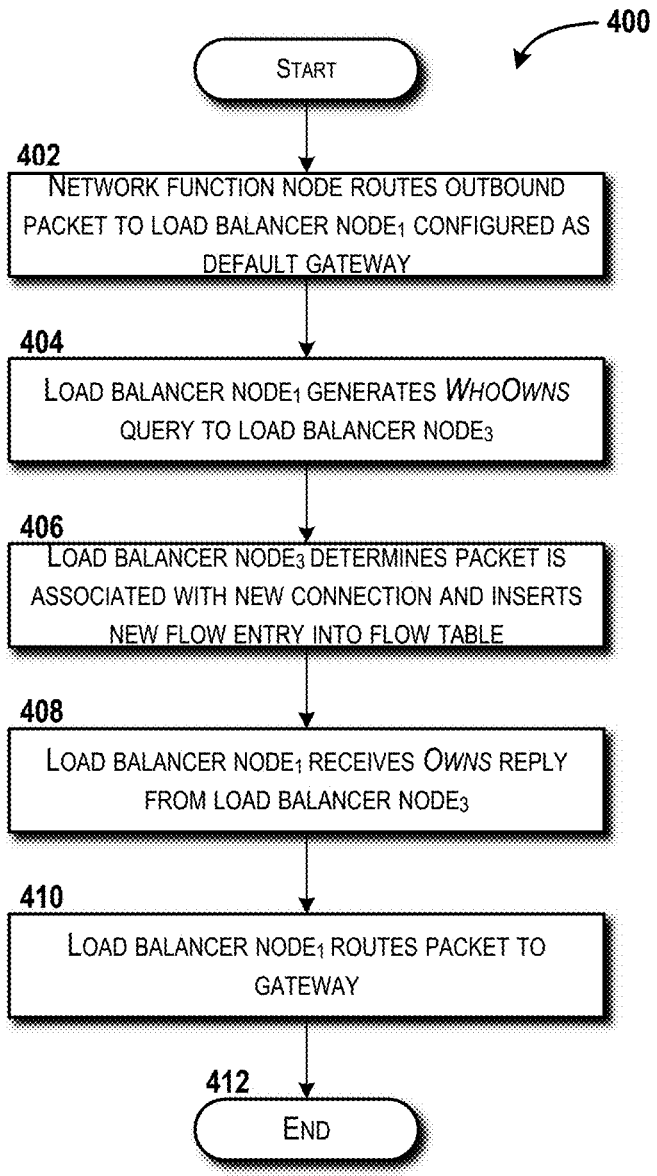
FIG. 4 is a flow diagram illustrating aspects of a method for preserving outbound connection affinity in a forward flow, according to an illustrative embodiment of the concepts and technologies disclosed herein.

Turning now to FIG. 4, aspects of a method 400 for preserving outbound connection affinity in a forward flow will be described, according to an illustrative embodiment of the concepts and technologies disclosed herein. The method 400 will be described with additional reference to FIG. 1D.

The method 400 begins and proceeds to operation 402. At operation 402, the network function node$_1$ 112A routes an outbound packet 110 to the load balancer node$_1$ 108A, which is configured as the default gateway for the network function node$_1$ 112A. This first packet of a new connection requires the load balancer node$_1$ 108A to create a new flow entry 118 storing the network function node$_1$ 112A (NF ID X) as the owner for this connection. From operation 402, the method 400 proceeds to operation 404. At operation 404, the load balancer node₁ 108A generates a WhoOwns query to the load balancer node₃ 108C. From operation 404, the method 400 proceeds to operation 406. At operation 406, the load balancer node₃ 108C determines that the packet 110 is associated with a new connection and inserts a new flow entry 118 into the distributed flow table 120.

From operation 406, the method 400 proceeds to operation 408. At operation 408, the load balancer node₁ 108A receives an Owns reply from the load balancer node₃ 108C. From operation 408, the method 400 proceeds to operation 410. At operation 410, the load balancer node₁ 108A routes the packet 110 to the gateway 104.

From operation 410, the method 400 proceeds to operation 412. The method 400 can end at operation 412.

Figure 5:
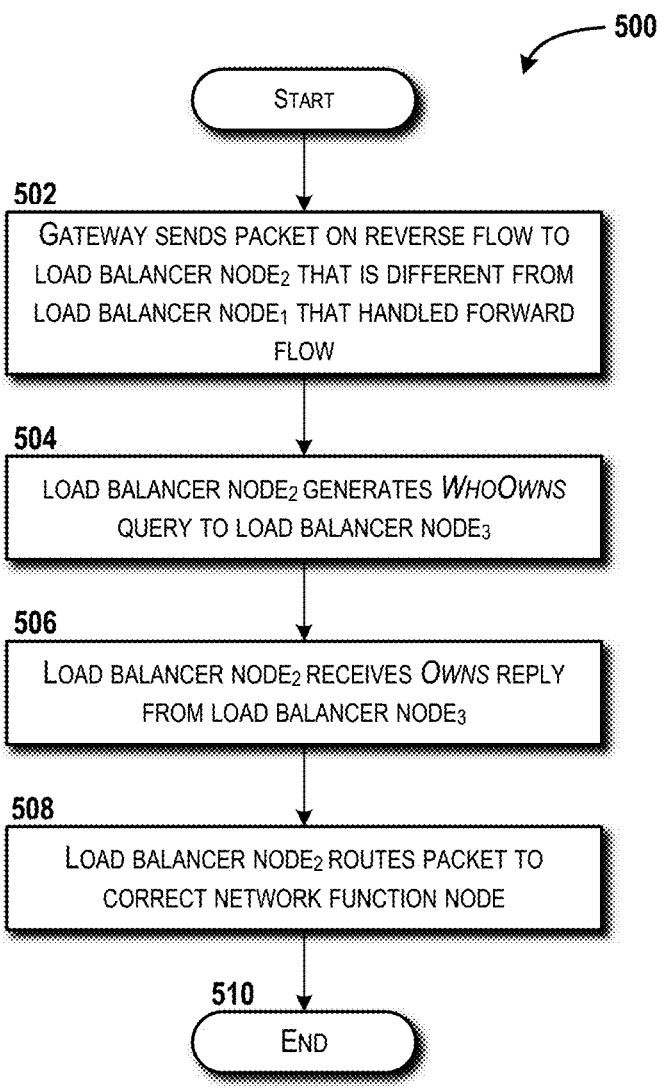
FIG. 5 is a flow diagram illustrating aspects of a method for preserving outbound connection affinity in a reverse flow, according to an illustrative embodiment of the concepts and technologies disclosed herein.

Turning now to FIG. 5, a flow diagram illustrating aspects of a method 500 for preserving outbound connection affinity in a reverse flow will be described, according to an illustrative embodiment of the concepts and technologies disclosed herein. The method 500 will be described with additional reference to FIG. 1D.

The method 500 begins and proceeds to operation 502. At operation 502, the gateway 104 sends the packet 110 on the reverse flow (shown as $p_r$ in FIG. 1D) to the load balancer node₂ 108B that is different from the load balancer node₁ 108A that handled the forward flow (described above with reference to FIGS. 1D and 4). From operation 502, the method 500 proceeds to operation 504. At operation 504, the load balancer node₂ 108B generates a WhoOwns query directed to the load balancer node₃ 108C. From operation 504, the method 500 proceeds to operation 506. At operation 506, the load balancer node₂ 108B receives an Owns reply from the load balancer node₃ 108C identifying the network function node₁ 112A (NF ID X) as the owner of the packet 110. From operation 506, the method 500 proceeds to operation 508. At operation 508, the load balancer node₂ 108B routes the packet 110 to the network function node₁ 112A.

From operation 508, the method 500 proceeds to operation 510. The method 500 can end at operation 510.

Figure 6:
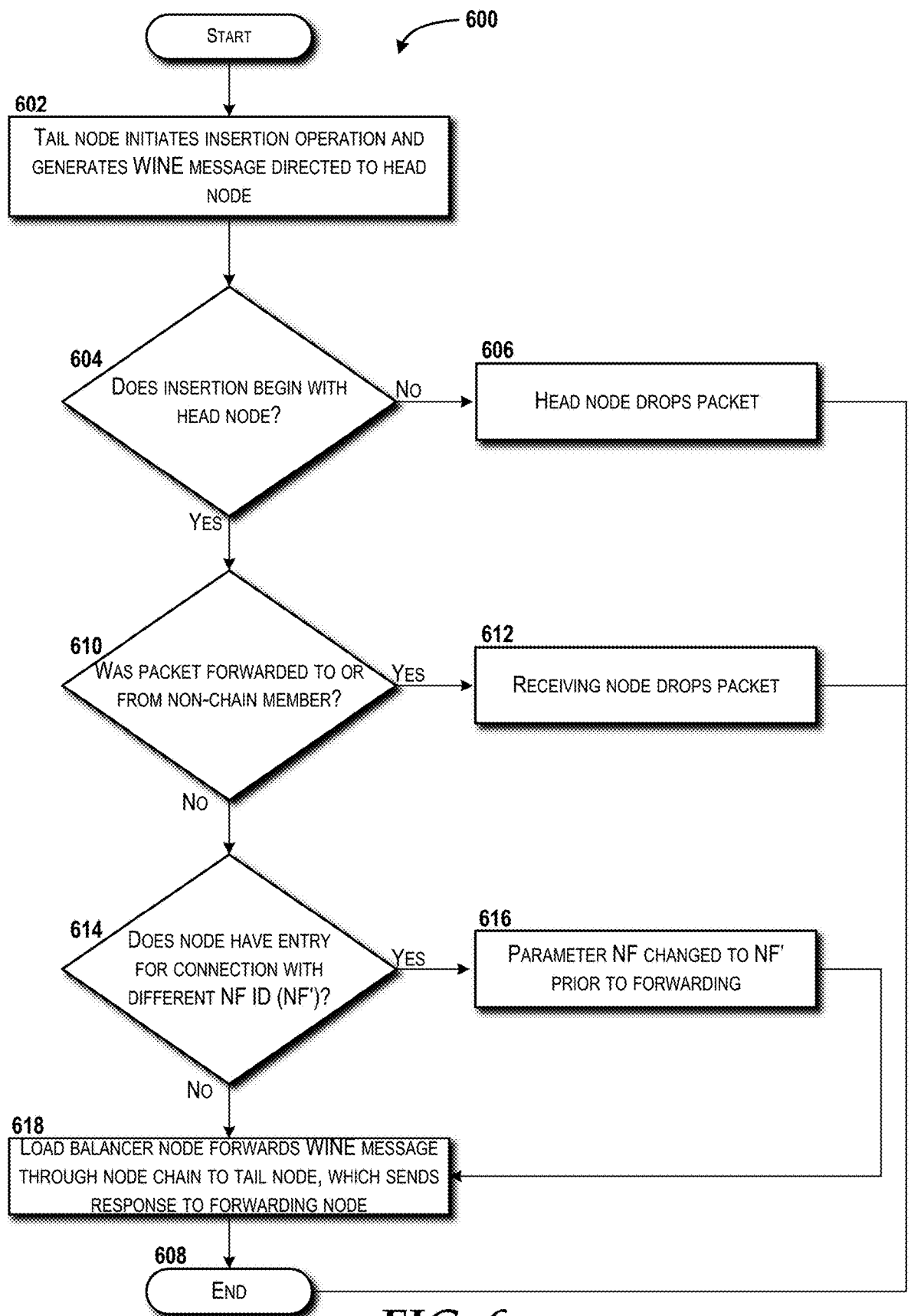
FIG. 6 is a flow diagram illustrating aspects of a method for performing insertion operations in accordance with a query protocol, according to an illustrative embodiment of the concepts and technologies disclosed herein.

Turning now to FIG. 6, a flow diagram illustrating aspects of a method 600 for performing insertion operations in accordance with the query protocol will be described, according to an illustrative embodiment of the concepts and technologies disclosed herein. The method 600 will be described with additional reference to FIG. 1E.

The method 600 begins and proceeds to operation 602. At operation 602, a load balancer node 108 operating as the tail node 128 of a node chain 126 (e.g., the load balancer node₂ 108A in FIG. 1E) initiates an insertion operation to insert a flow entry 118 into the distributed flow table 120 for a new connection. Also at operation 602, the tail node 128 generates a WriteIfNotExists (WINE) message directed to the head node 130 of the node chain 126 (e.g., the load balancer node₄ 108D in FIG. 1E). The remaining operations of the method 600 can be performed at each load balancer node 108 in the node chain 126.

From operation 602, the method 600 proceeds to operation 604. At operation 604, the load balancer node 108 determines whether the insertion operation begins with the head node 130. If the load balancer node 108 determines that the insertion operation does not begin with the head node 130, the method 600 proceeds to operation 606. At operation 606, the head node 130 drops the packet 110. From operation 606, the method 600 proceeds to operation 608. At operation 608, replication is aborted and the method 600 can end. Returning to operation 604, if the load balancer node 108 determines that the insertion operation begins with the head node 130, the method 600 proceeds to operation 610.

At operation 610, the load balancer node 108 determines whether the packet 110 was forwarded to or received from a non-chain member node (e.g., due to a reconfiguration event). If the load balancer node 108 determines that the packet 110 was forwarded to or received from a non-chain member node, the method 600 proceeds to operation 612. At operation 612, the load balancer node 108 (receiving node) drops the packet 110. From operation 612, the method 600 proceeds to operation 608. At operation 608, replication is aborted and the method 600 can end. Returning to operation 610, if the load balancer node 108 determines that the packet 110 was not forwarded to or received from a non-chain member node, the method 600 proceeds to operation 614.

At operation 614, the load balancer node 108 determines whether the flow table 120 contains a flow entry 118 for the connection with a different NF ID nf'. If so, the method 600 proceeds to operation 616. At operation 616, the parameter nf is changed to nf' prior to forwarding the WINE message to the next hop. From operation 616, the method 600 proceeds to operation 618. At operation 618, the load balancer node 108 forwards the WINE message through the node chain 126 to the tail node 128, which sends a response to the forwarding node. Returning to operation 614, if the load balancer node 108 instead determines that the flow table 120 does not contain a flow entry 118 for the connection with a different NF ID nf', the method 600 proceeds directly to operation 618. In either case, from operation 618, the method 600 proceeds to operation 608. The method 600 can end at operation 608.

Figure 7:
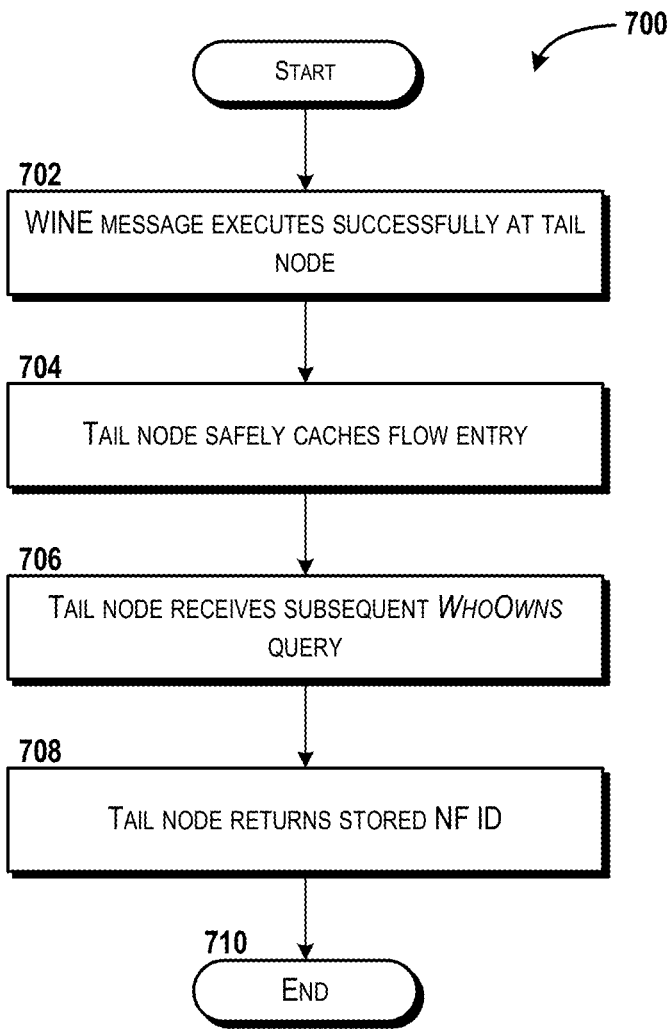
FIG. 7 is a flow diagram illustrating aspects of a method for performing caching operations in accordance with a query protocol, according to an illustrative embodiment of the concepts and technologies disclosed herein.

Turning now to FIG. 7, a flow diagram illustrating aspects of a method 700 for performing caching operations in accordance with the query protocol will be described, according to an illustrative embodiment of the concepts and technologies disclosed herein. The method 700 begins and proceeds to operation 702. At operation 702, it is assumed that the WINE message executes successfully at the tail node 128 of the node chain 126. From operation 702, the method 700 proceeds to operation 704. At operation 704, the tail node 128 safely caches the flow entry 118 in the flow table 120. From operation 704, the method 700 proceeds to operation 706. At operation 706, the tail node 128 receives a subsequent WhoOwns query. From operation 706, the method 700 proceeds to operation 708. At operation 708, the tail node 128 returns the stored NF ID. From operation 708, the method 700 proceeds to operation 710. The method 700 can end at operation 710.

The load balancer nodes 108 can guard against using a flow entry 118 at a non-tail node to forward packets 110. This can be accomplished by adding a single cacheable bit to the flow entry 118 for each connection. This bit can be set to 1 in the flow entry 118 stored at the tail node 128 or if the flow entry 118 is obtained from the tail node 128 in response to a WhoOwns query. Otherwise, this bit can be set to 0 at other nodes, implying that those flow entries 118 cannot be used to forward packets 110.

Figure 8:
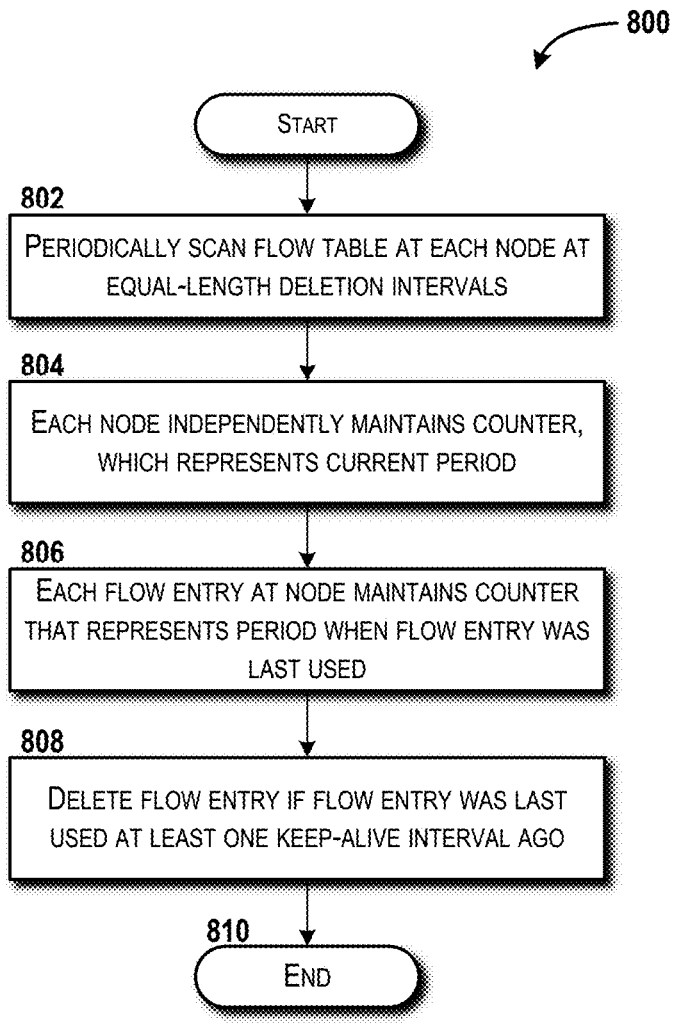
FIG. 8 is a flow diagram illustrating aspects of a method for performing deletion operations in accordance with a query protocol, according to an illustrative embodiment of the concepts and technologies disclosed herein.

Turning now to FIG. 8, a method 800 for performing deletion operations in accordance with the query protocol will be described, according to an illustrative embodiment of the concepts and technologies disclosed herein. The method 800 begins and proceeds to operation 802. At operation 802, each load balancer node 108 periodically scans the flow table 120 at equal-length deletion intervals. From operation 802, the method 800 proceeds to operation 804. At operation 804, each load balancer node 108 maintains a counter, which represents a current period. From operation 804, the method 800 proceeds to operation 806. At operation 806, each flow entry 118 at the load balancer nodes 108 also maintains a counter, which represents the period when the flow entry 118 was last used. From operation 806, the method 800 proceeds to operation 808. At operation 808, each load balancer node 108 deletes a flow entry 118 if the flow entry 118 was last used at least one keep-alive interval ago. From operation 808, the method 800 proceeds to operation 810. The method 800 can end at operation 810.

Figure 9:
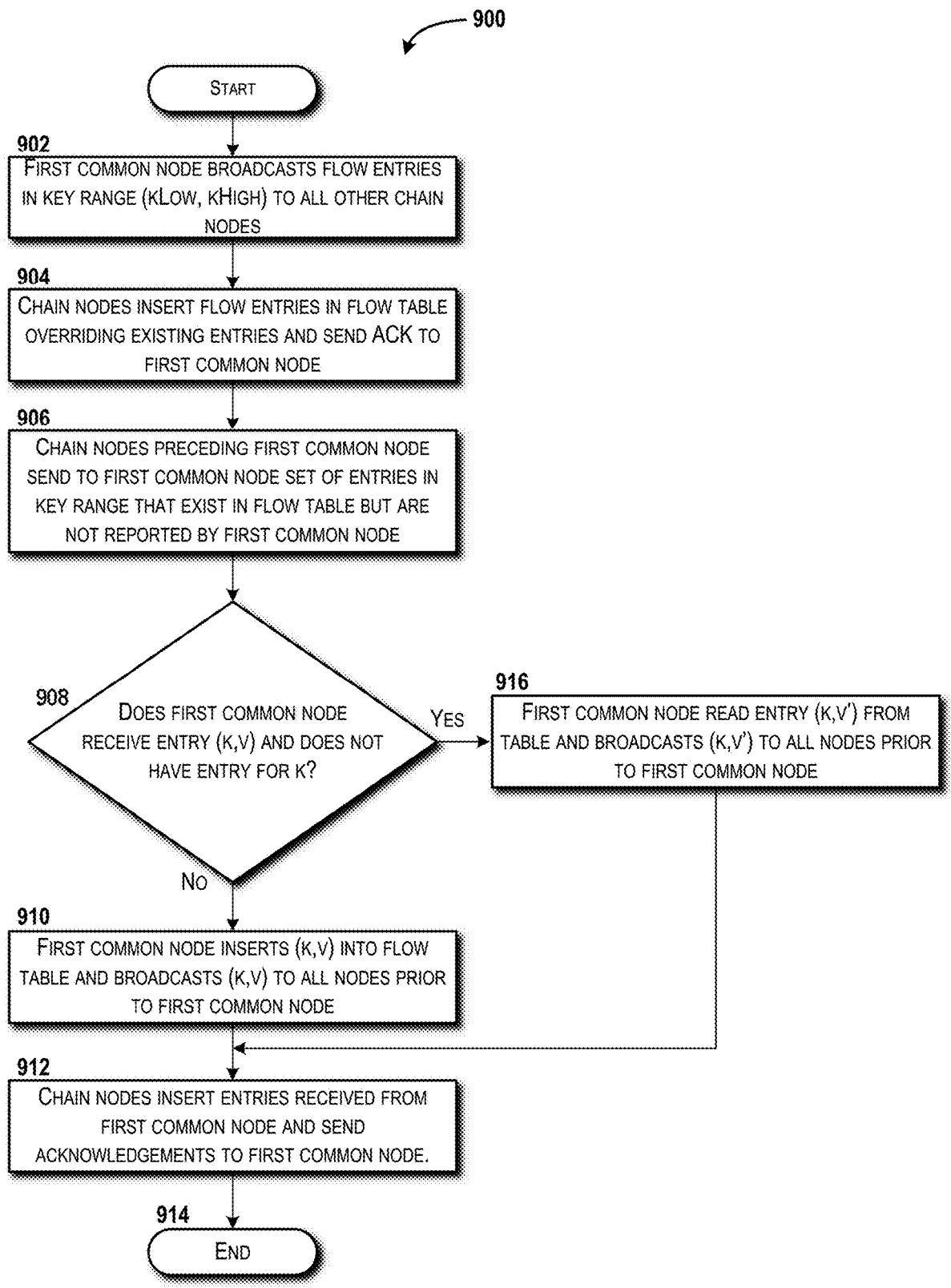
FIG. 9 is a flow diagram illustrating aspects of a method for implementing a sync protocol, according to an illustrative embodiment of the concepts and technologies disclosed herein.

Turning now to FIG. 9, a flow diagram illustrating aspects of a method 900 for implementing the sync protocol will be described, according to an illustrative embodiment of the concepts and technologies disclosed herein. The method 900 will be described with additional reference to FIG. 1H.

The method 900 begins and proceeds to operation 902. At operation 902, the first common node in a node chain 126 broadcasts entries in a key range (kLow, kHigh) to all other chain nodes. From operation 902, the method 900 proceeds to operation 904. At operation 904, the chain nodes insert the entries into the flow table 120 overriding existing entries and sending an ACK to the first common node. From operation 904, the method 900 proceeds to operation 906. At operation 906, the chain nodes preceding the first common node send to the first common node the set of entries in the key range that exist in the flow table 120 but are not reported by the first common node.

From operation 906, the method 900 proceeds to operation 908. At operation 908, the first common node determines if an entry (k,v) has been received and it does not have an entry for k. If not, the method 900 proceeds to operation 910. At operation 910, the first common node inserts (k,v) into the flow table and broadcasts (k,v) to all nodes prior to the first common node. From operation 910, the method 900 proceeds to operation 912. At operation 912, the chain nodes insert the entries received from the first common node and send acknowledgments to the first common node. From operation 912, the method 900 proceeds to operation 914. The method 900 can end at operation 914. Returning to operation 908, if the first common node instead determines it has an entry (k,v) and an entry for k, the method 900 proceeds to operation 916. At operation 916, the first common node reads the entry (k,v') from the flow table 120 and broadcasts to all nodes prior to the first common node. From operation 916, the method 900 proceeds to operation 912, described above.

Figure 10:
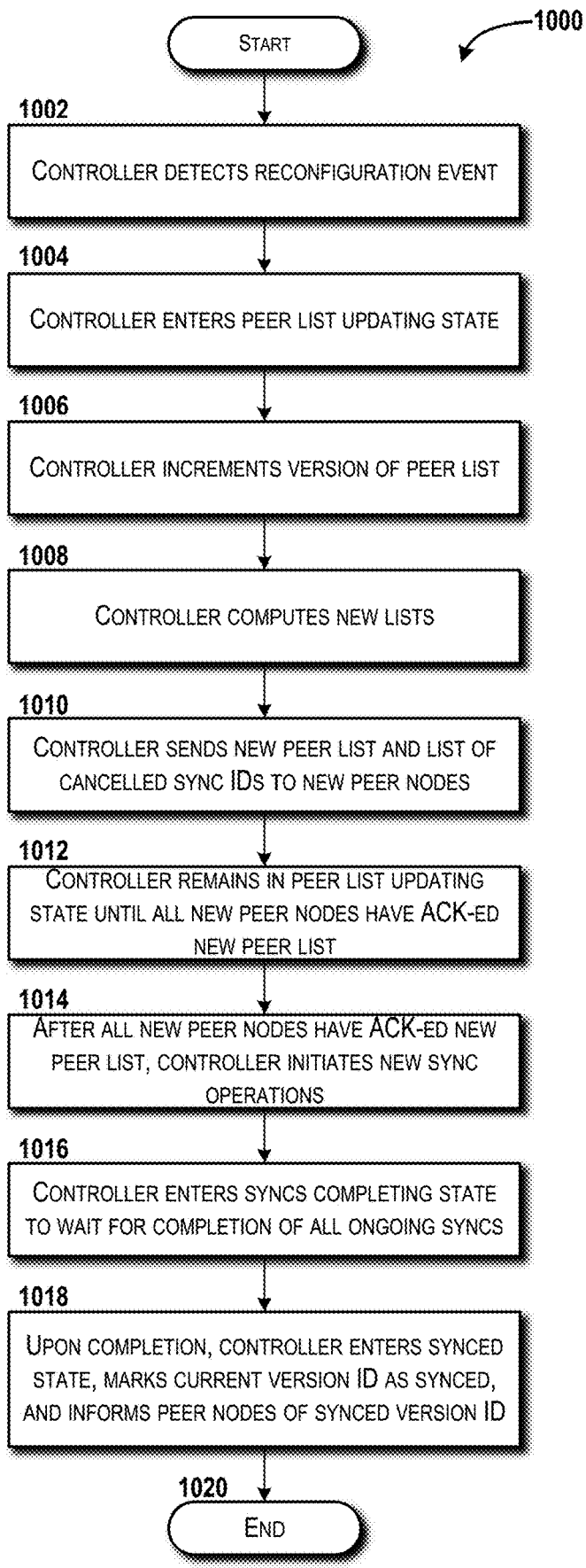
FIG. 10 is a flow diagram illustrating aspects of method for implementing a controller protocol, according to an illustrative embodiment of the concepts and technologies disclosed herein.

Turning now to FIG. 10, a flow diagram illustrating aspects of a method 1000 for implementing the controller protocol will be described, according to an illustrative embodiment of the concepts and technologies disclosed herein. The method 1000 will be described with additional reference to FIG. 1I.

The method 1000 begins and proceeds to operation 1002. At operation 1002, the controller 122 detects a reconfiguration event, such as the addition or removal of one or more load balancer nodes 108. From operation 1002, the method 1000 proceeds to operation 1004. At operation 1004, the controller 122 enters the peer list updating state 138 (shown in FIG. 1I). From operation 1004, the method 1000 proceeds to operation 1006. At operation 1006, the controller 122 increments the version of the peer list 124. From operation 1006, the method 1000 proceeds to operation 1008. At operation 1008, the controller 122 computes two new lists. One list describes the new sync operations as a result of the reconfiguration event. The other list describes the cancelled sync operations from any previous reconfiguration that are overridden by the new sync operations.

From operation 1008, the method 1000 proceeds to operation 1010. At operation 1010, the controller 122 sends the new peer list and the list of cancelled sync IDs to the new peer nodes. From operation 1010, the method 1000 proceeds to operation 1012. At operation 1012, the controller 122 remains in the peer list updating state 138 until all new peer nodes have acknowledged the new peer list. From operation 1012, the method 1000 proceeds to operation 1014. At operation 1014, after all new peer nodes have acknowledged the new peer list, the controller initiates the new sync operations.

From operation 1014, the method 1000 proceeds to operation 1016. At operation 1016, the controller 122 enters the syncs completing state 140 (shown in FIG. 1I) to wait for completion of all ongoing syncs. From operation 1016, the method 1000 proceeds to operation 1018. At operation 1018, upon completion of all ongoing syncs, the controller 122 enters the synced state 142 (shown in FIG. 1I), marks the current version ID as synced, and informs the peer nodes of the synced version ID.

From operation 1018, the method 1000 proceeds to operation 1020. The method 1000 can end at operation 1020.

Figure 11:
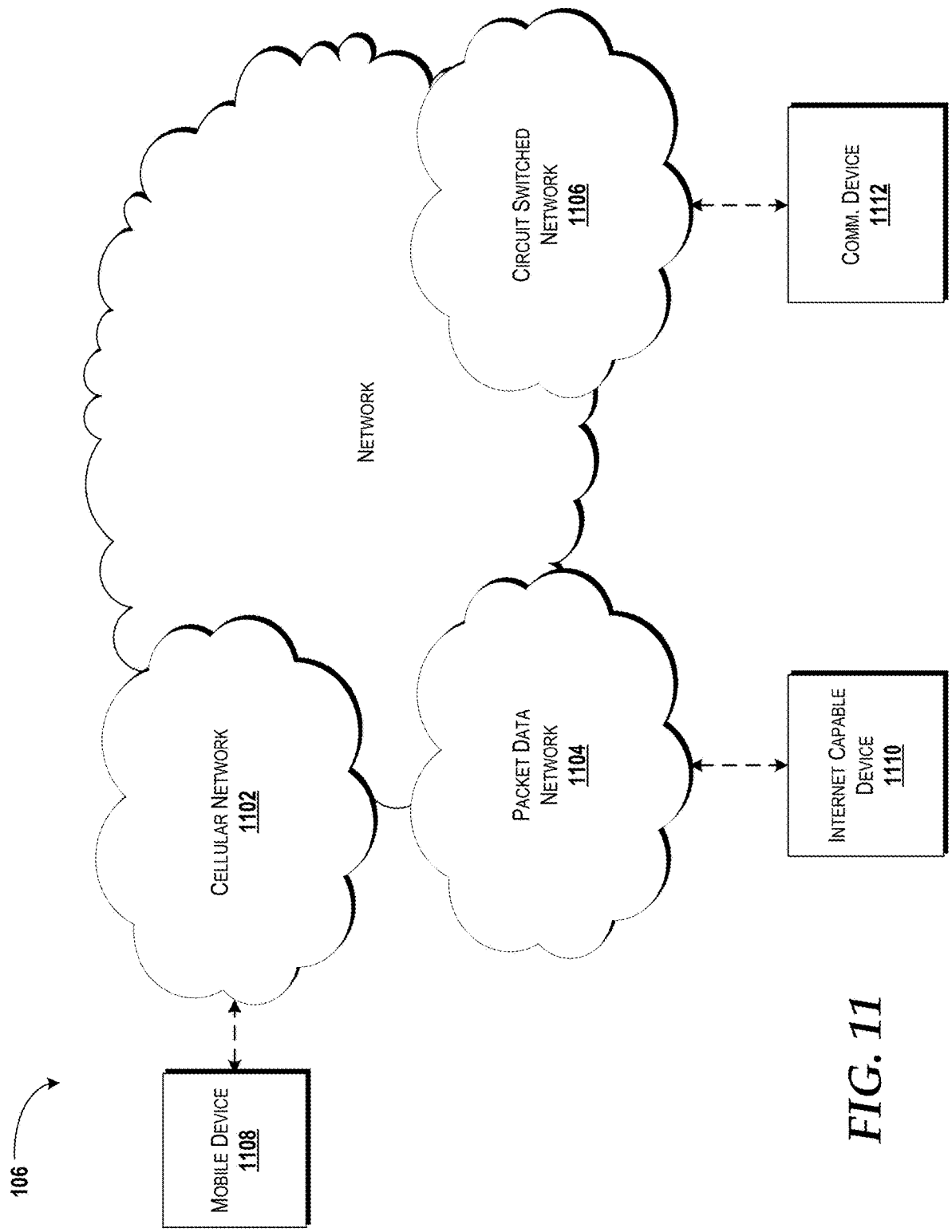
FIG. 11 schematically illustrates a network, according to an illustrative embodiment of the concepts and technologies described herein.

Turning now to FIG. 11, additional details of the network 106 are illustrated, according to an illustrative embodiment. The network 106 includes a cellular network 1102, a packet data network 1104, for example, the Internet, and a circuit switched network 1106, for example, a publicly switched telephone network ("PSTN"). The cellular network 1102 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 1102 also includes radios and nodes for receiving and transmitting voice, data, and combinations thereof to and from radio transceivers, networks, the packet data network 1104, and the circuit switched network 1106.

A mobile communications device 1108, such as, for example, a cellular telephone, a user equipment, a mobile terminal, a PDA, a laptop computer, a handheld computer, and combinations thereof, can be operatively connected to the cellular network 1102. The cellular network 1102 can be configured as a 2G GSM network and can provide data communications via GPRS and/or EDGE. Additionally, or alternatively, the cellular network 1102 can be configured as a 3G UMTS network and can provide data communications via the HSPA protocol family, for example, HSDPA, EUL (also referred to as HSDPA), and HSPA+. The cellular network 1102 also is compatible with 4G mobile communications standards as well as evolved and future mobile standards.

The packet data network 1104 includes various devices, for example, servers, computers, databases, and other devices in communication with one another, as is generally known. The packet data network 1104 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1104 includes or is in communication with the Internet. The circuit switched network 1106 includes various hardware and software for providing circuit switched communications. The circuit switched network 1106 may include, or may be, what is often referred to as a plain old telephone system (POTS). The functionality of a circuit switched network 1106 or other circuit-switched network are generally known and will not be described herein in detail.

The illustrated cellular network 1102 is shown in communication with the packet data network 1104 and a circuit switched network 1106, though it should be appreciated that this is not necessarily the case. One or more Internet-capable devices 1110, for example, a PC, a laptop, a portable device, or another suitable device, can communicate with one or more cellular networks 1102, and devices connected thereto, through the packet data network 1104. It also should be appreciated that the Internet-capable device 1110 can communicate with the packet data network 1104 through the circuit switched network 1106, the cellular network 1102, and/or via other networks (not illustrated).

As illustrated, a communications device 1112, for example, a telephone, facsimile machine, modem, computer, or the like, can be in communication with the circuit switched network 1106, and therethrough to the packet data network 1104 and/or the cellular network 1102. It should be appreciated that the communications device 1112 can be an Internet-capable device, and can be substantially similar to the Internet-capable device 1110. In the specification, the network 106 is used to refer broadly to any combination of the networks 1102, 1104, 1106. It should be appreciated that substantially all of the functionality described with reference to the network 106 can be performed by the cellular network 1102, the packet data network 1104, and/or the circuit switched network 1106, alone or in combination with other networks, network elements, and the like.

Figure 12:
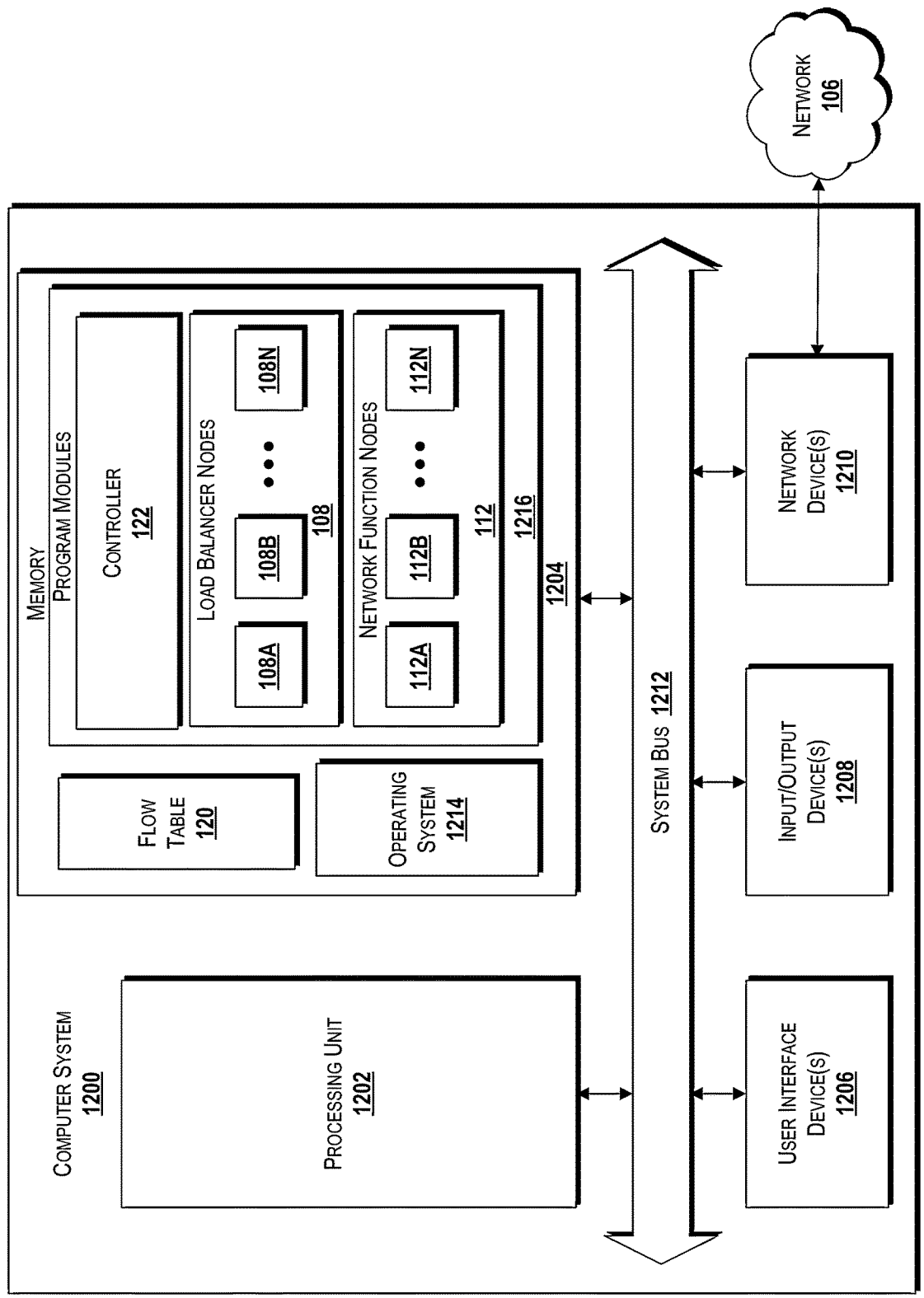
FIG. 12 is a block diagram illustrating an example computer system configured to provide a distributed stateful load balancer, according to some illustrative embodiments of the concepts and technologies described herein.

FIG. 12 is a block diagram illustrating a computer system 1200 configured to provide the functionality described herein for a distributed stateful load balancer, in accordance with various embodiments of the concepts and technologies disclosed herein. The computer system 1200 includes a processing unit 1202, a memory 1204, one or more user interface devices 1206, one or more input/output ("I/O") devices 1208, and one or more network devices 1210, each of which is operatively connected to a system bus 1212. The bus 1212 enables bi-directional communication between the processing unit 1202, the memory 1204, the user interface devices 1206, the I/O devices 1208, and the network devices 1210.

The processing unit 1202 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 1204 communicates with the processing unit 1202 via the system bus 1212. In some embodiments, the memory 1204 is operatively connected to a memory controller (not shown) that enables communication with the processing unit 1202 via the system bus 1212. The memory 1204 includes an operating system 1214 and one or more program modules 1216. The operating system 1214 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 1216 may include various software and/or program modules described herein. In some embodiments, for example, the program modules 1216 include the gateway 104, the load balancer nodes 108, the network function nodes 112, the controller 122, or some combination thereof. These and/or other modules and/or programs can be embodied in computer-readable media containing instructions that, when executed by the processing unit 1202, perform one or more of the methods 200, 300, 400, 500, 600, 700, 800, 900, 1000 described in detail above with respect to FIGS. 2-10 and/or other functionality as illustrated and described herein. It can be appreciated that, at least by virtue of the instructions embodying the methods 200, 300, 400, 500, 600, 700, 800, 900, 1000 and/or other functionality illustrated and described herein being stored in the memory 1204 and/or accessed and/or executed by the processing unit 1202, the computer system 1200 is a special-purpose computing system that can facilitate providing the functionality illustrated and described herein. According to embodiments, the program modules 1216 may be embodied in hardware, software, firmware, or any combination thereof. Although not shown in FIG. 12, it should be understood that the memory 1204 also can be configured to store packets 110, hash values, caches and/or data associated therewith, flow tables 120, flow entries 118, queries and/or responses, state transfer commands, and/or other data, if desired.

By way of example, and not limitation, computer-readable media may include any available computer storage media or communication media that can be accessed by the computer system 1200. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1200. In the claims, the phrase "computer storage medium," "computer-readable storage medium," and variations thereof does not include waves or signals per se and/or communication media, and therefore should be construed as being directed to "non-transitory" media only.

The user interface devices 1206 may include one or more devices with which a user accesses the computer system 1200. The user interface devices 1206 may include, but are not limited to, computers, servers, personal digital assistants, cellular phones, or any suitable computing devices. The I/O devices 1208 enable a user to interface with the program modules 1216. In one embodiment, the I/O devices 1208 are operatively connected to an I/O controller (not shown) that enables communication with the processing unit 1202 via the system bus 1212. The I/O devices 1208 may include one or more input devices, such as, but not limited to, a keyboard, a mouse, or an electronic stylus. Further, the I/O devices 1208 may include one or more output devices, such as, but not limited to, a display screen or a printer.

The network devices 1210 enable the computer system 1200 to communicate with other networks or remote systems via a network, such as the network 106. Examples of the network devices 1210 include, but are not limited to, a modem, a radio frequency ("RF") or infrared ("IR") transceiver, a telephonic interface, a bridge, a router, or a network card. The network 106 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as WiMAX network, or a cellular network. Alternatively, the network 106 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 13:
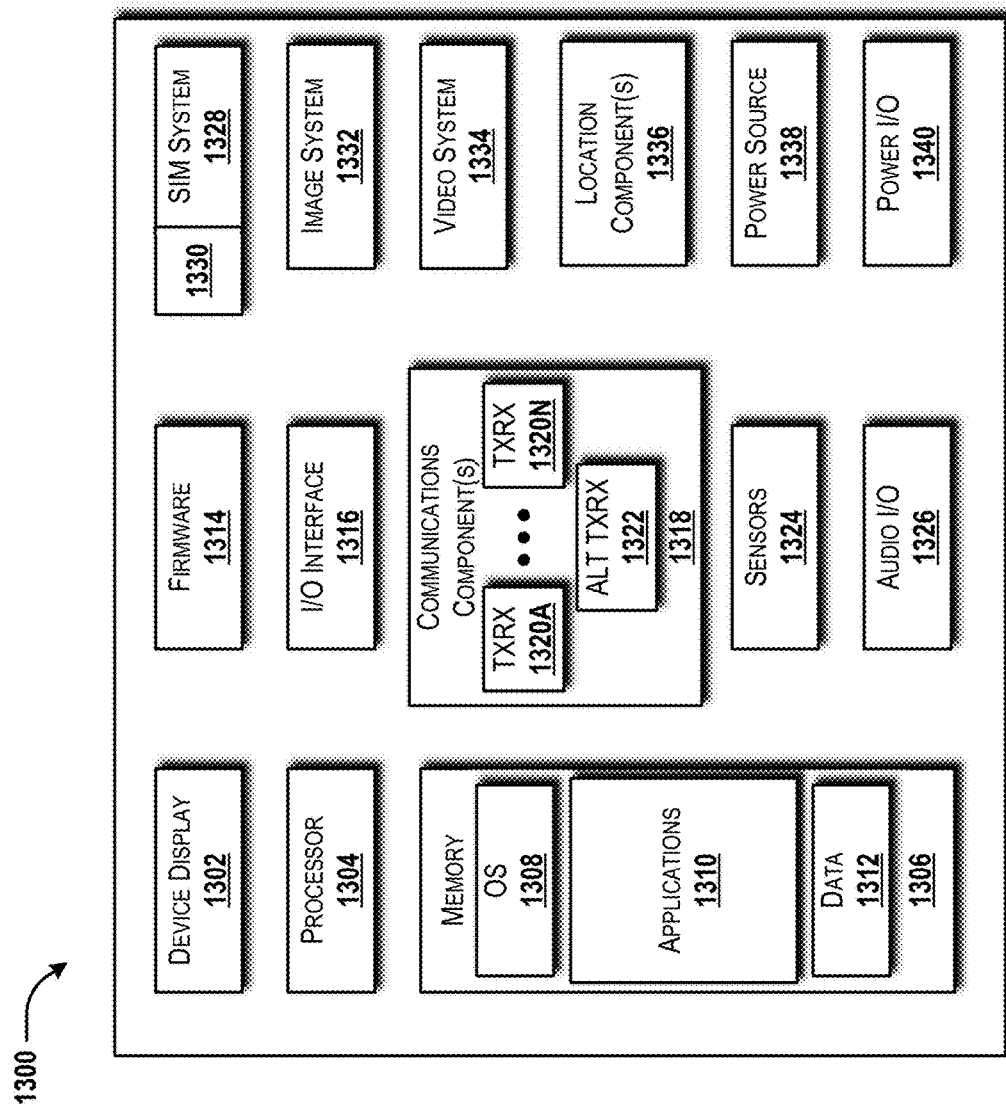
FIG. 13 is a block diagram illustrating an example mobile device, according to an illustrative embodiment.

Turning now to FIG. 13, an illustrative mobile device 1300 and components thereof will be described. While connections are not shown between the various components illustrated in FIG. 13, it should be understood that some, none, or all of the components illustrated in FIG. 13 can be configured to interact with one other to carry out various device functions. In some embodiments, the components are arranged so as to communicate via one or more busses (not shown). Thus, it should be understood that FIG. 13 and the following description are intended to provide a general understanding of a suitable environment in which various aspects of embodiments can be implemented, and should not be construed as being limiting in any way.

As illustrated in FIG. 13, the mobile device 1300 can include a device display 1302 for displaying data. According to various embodiments, the device display 1302 can be configured to display any information. The mobile device 1300 also can include a processor 1304 and a memory or other data storage device ("memory") 1306. The processor 1304 can be configured to process data and/or can execute computer-executable instructions stored in the memory 1306. The computer-executable instructions executed by the processor 1304 can include, for example, an operating system 1308, one or more applications 1310, other computer-executable instructions stored in the memory 1306, or the like. In some embodiments, the applications 1310 also can include a UI application (not illustrated in FIG. 13).

The UI application can interface with the operating system 1308 to facilitate user interaction with functionality and/or data stored at the mobile device 1300 and/or stored elsewhere. In some embodiments, the operating system 1308 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 1304 to aid a user in interacting with data. The UI application can be executed by the processor 1304 to aid a user in answering/initiating calls, entering/deleting other data, entering and setting user IDs and passwords for device access, configuring settings, manipulating address book content and/or settings, multimode interaction, interacting with other applications 1310, and otherwise facilitating user interaction with the operating system 1308, the applications 1310, and/or other types or instances of data 1312 that can be stored at the mobile device 1300.

According to various embodiments, the applications 1310 can include, for example, a web browser application, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 1310, the data 1312, and/or portions thereof can be stored in the memory 1306 and/or in a firmware 1314, and can be executed by the processor 1304. The firmware 1314 also can store code for execution during device power up and power down operations. It should be appreciated that the firmware 1314 can be stored in a volatile or non-volatile data storage device including, but not limited to, the memory 1306 and/or a portion thereof.

The mobile device 1300 also can include an input/output ("I/O") interface 1316. The I/O interface 1316 can be configured to support the input/output of data. In some embodiments, the I/O interface 1316 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 1300 can be configured to synchronize with another device to transfer content to and/or from the mobile device 1300. In some embodiments, the mobile device 1300 can be configured to receive updates to one or more of the applications 1310 via the I/O interface 1316, though this is not necessarily the case. In some embodiments, the I/O interface 1316 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 1316 may be used for communications between the mobile device 1300 and a network device or local device.

The mobile device 1300 also can include a communications component 1318. The communications component 1318 can be configured to interface with the processor 1304 to facilitate wired and/or wireless communications with one or more networks. In some embodiments, the communications component 1318 includes a multimode communications subsystem for facilitating communications via the cellular network and one or more other networks.

The communications component 1318, in some embodiments, includes one or more transceivers. The one or more transceivers, if included, can be configured to communicate over the same and/or different wireless technology standards with respect to one another. For example, in some embodiments one or more of the transceivers of the communications component 1318 may be configured to communicate using GSM, CDMAONE, CDMA2000, LTE, and various other 2G, 2.5G, 3G, 4G, 5G and greater generation technology standards. Moreover, the communications component 1318 may facilitate communications over various channel access methods (which may or may not be used by the aforementioned standards) including, but not limited to, TDMA, FDMA, W-CDMA, OFDM, SDMA, and the like.

In addition, the communications component 1318 may facilitate data communications using GPRS, EDGE, the HSPA protocol family including HSDPA, EUL or otherwise termed HSDPA, HSPA+, and various other current and future wireless data access standards. In the illustrated embodiment, the communications component 1318 can include a first transceiver ("TxRx") 1320A that can operate in a first communications mode (e.g., GSM). The communications component 1318 also can include an Nth transceiver ("TxRx") 1320N that can operate in a second communications mode relative to the first transceiver 1320A (e.g., UMTS). While two transceivers 1320A-N (hereinafter collectively and/or generically referred to as "transceivers 1320") are shown in FIG. 13, it should be appreciated that less than two, two, or more than two transceivers 1320 can be included in the communications component 1318.

The communications component 1318 also can include an alternative transceiver ("Alt TxRx") 1322 for supporting other types and/or standards of communications. According to various contemplated embodiments, the alternative transceiver 1322 can communicate using various communications technologies such as, for example, WI-FI, WIMAX, BLUETOOTH, BLE, infrared, infrared data association ("IRDA"), near field communications ("NFC"), other RF technologies, combinations thereof, and the like.

In some embodiments, the communications component 1318 also can facilitate reception from terrestrial radio networks, digital satellite radio networks, internet-based radio service networks, combinations thereof, and the like. The communications component 1318 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 1300 also can include one or more sensors 1324. The sensors 1324 can include temperature sensors, light sensors, air quality sensors, movement sensors, orientation sensors, noise sensors, proximity sensors, or the like. As such, it should be understood that the sensors 1324 can include, but are not limited to, accelerometers, magnetometers, gyroscopes, infrared sensors, noise sensors, microphones, combinations thereof, or the like. One or more of the sensors 1324 can be used to detect movement of the mobile device 1300. Additionally, audio capabilities for the mobile device 1300 may be provided by an audio I/O component 1326. The audio I/O component 1326 of the mobile device 1300 can include one or more speakers for the output of audio signals, one or more microphones for the collection and/or input of audio signals, and/or other audio input and/or output devices.

The illustrated mobile device 1300 also can include a subscriber identity module ("SIM") system 1328. The SIM system 1328 can include a universal SIM ("USIM"), a universal integrated circuit card ("UICC") and/or other identity devices. The SIM system 1328 can include and/or can be connected to or inserted into an interface such as a slot interface 1330. In some embodiments, the slot interface 1330 can be configured to accept insertion of other identity cards or modules for accessing various types of networks. Additionally, or alternatively, the slot interface 1330 can be configured to accept multiple subscriber identity cards. Because other devices and/or modules for identifying users and/or the mobile device 1300 are contemplated, it should be understood that these embodiments are illustrative, and should not be construed as being limiting in any way.

The mobile device 1300 also can include an image capture and processing system 1332 ("image system"). The image system 1332 can be configured to capture or otherwise obtain photos, videos, and/or other visual information. As such, the image system 1332 can include cameras, lenses, CCDs, combinations thereof, or the like. The mobile device 1300 may also include a video system 1334. The video system 1334 can be configured to capture, process, record, modify, and/or store video content. Photos and videos obtained using the image system 1332 and the video system 1334, respectively, may be added as message content to an MMS message, email message, and sent to another mobile device. The video and/or photo content also can be shared with other devices via various types of data transfers via wired and/or wireless communication devices as described herein.

The mobile device 1300 also can include one or more location components 1336. The location components 1336 can be configured to send and/or receive signals to determine a specific location of the mobile device 1300. According to various embodiments, the location components 1336 can send and/or receive signals from GPS devices, A-GPS devices, WI-FI/WIMAX and/or cellular network triangulation data, combinations thereof, and the like. The location component 1336 also can be configured to communicate with the communications component 1318 to retrieve triangulation data from the mobile telecommunications network for determining a location of the mobile device 1300. In some embodiments, the location component 1336 can interface with cellular network nodes, telephone lines, satellites, location transmitters and/or beacons, wireless network transmitters and receivers, combinations thereof, and the like. In some embodiments, the location component 1336 can include and/or can communicate with one or more of the sensors 1324 such as a compass, an accelerometer, and/or a gyroscope to determine the orientation of the mobile device 1300. Using the location component 1336, the mobile device 1300 can generate and/or receive data to identify its geographic location, or to transmit data used by other devices to determine the location of the mobile device 1300. The location component 1336 may include multiple components for determining the location and/or orientation of the mobile device 1300.

The illustrated mobile device 1300 also can include a power source 1338. The power source 1338 can include one or more batteries, power supplies, power cells, and/or other power subsystems including alternating current ("AC") and/or direct current ("DC") power devices. The power source 1338 also can interface with an external power system or charging equipment via a power I/O component 1340. Because the mobile device 1300 can include additional and/or alternative components, the above embodiment should be understood as being illustrative of one possible operating environment for various embodiments of the concepts and technologies described herein. The described embodiment of the mobile device 1300 is illustrative, and should not be construed as being limiting in any way.

Figure 14:
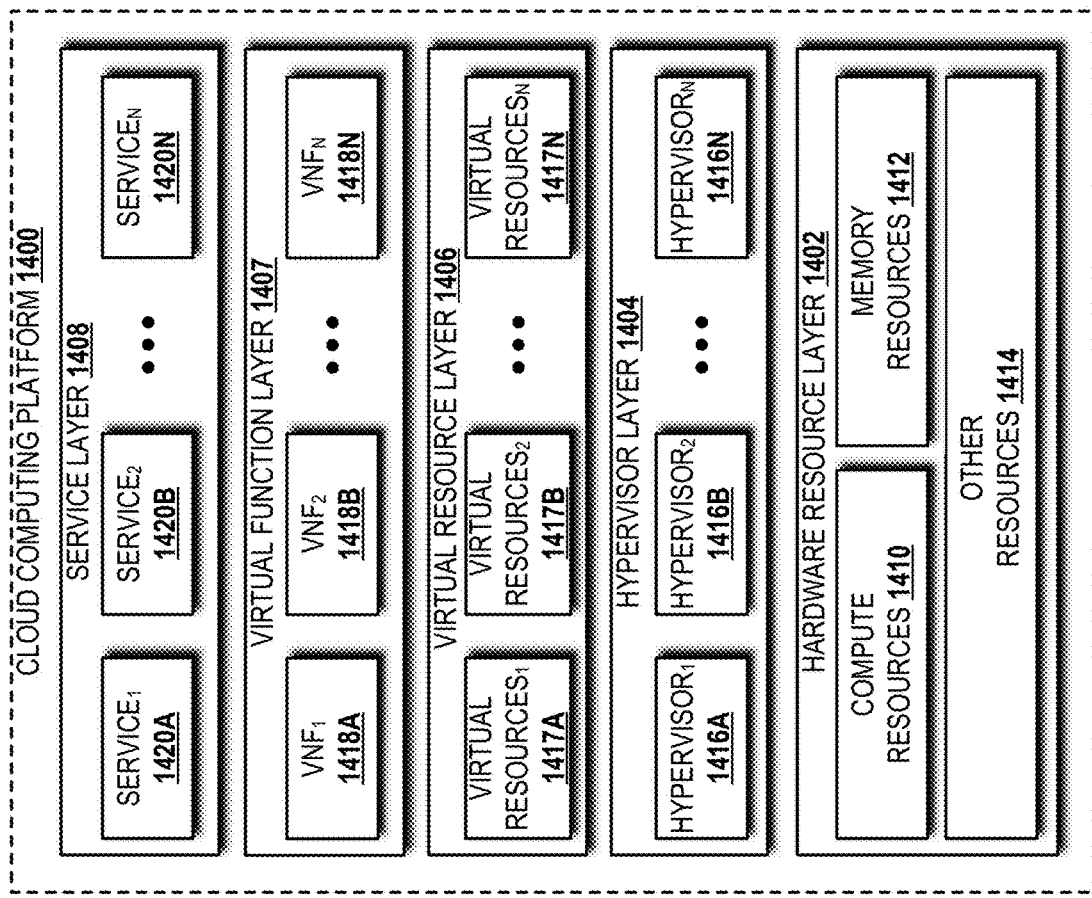
FIG. 14 is a block diagram illustrating a cloud computing platform capable of implementing aspects of the concepts and technologies disclosed herein.

Turning now to FIG. 14, an illustrative cloud computing platform 1400 will be described, according to an illustrative embodiment. The computing environment 102 or portions thereof can be implemented on a cloud architecture such as the cloud computing platform 1400. The cloud computing platform 1400 includes a hardware resource layer 1402, a hypervisor layer 1404, a virtual resource layer 1406, a virtual function layer 1407, and a service layer 1408. While no connections are shown between the layers illustrated in FIG. 14, it should be understood that some, none, or all of the components illustrated in FIG. 14 can be configured to interact with one other to carry out various functions described herein. In some embodiments, the components are arranged so as to communicate via one or more networks. Thus, it should be understood that FIG. 14 and the remaining description are intended to provide a general understanding of a suitable environment in which various aspects of the embodiments described herein can be implemented and should not be construed as being limiting in any way.

The hardware resource layer 1402 provides hardware resources. In the illustrated embodiment, the hardware resource layer 1402 includes one or more compute resources 1410, one or more memory resources 1412, and one or more other resources 1414. The compute resource(s) 1410 can include one or more hardware components that perform computations to process data and/or to execute computer-executable instructions of one or more application programs, one or more operating systems, and/or other software. In particular, the compute resources 1410 can include one or more central processing units ("CPUs") configured with one or more processing cores. The compute resources 1410 can include one or more graphics processing unit ("GPU") configured to accelerate operations performed by one or more CPUs, and/or to perform computations to process data, and/or to execute computer-executable instructions of one or more application programs, one or more operating systems, and/or other software that may or may not include instructions particular to graphics computations. In some embodiments, the compute resources 1410 can include one or more discrete GPUs. In some other embodiments, the compute resources 1410 can include CPU and GPU components that are configured in accordance with a co-processing CPU/GPU computing model, wherein the sequential part of an application executes on the CPU and the computationally-intensive part is accelerated by the GPU processing capabilities. The compute resources 1410 can include one or more system-on-chip ("SoC") components along with one or more other components, including, for example, one or more of the memory resources 1412, and/or one or more of the other resources 1414. In some embodiments, the compute resources 1410 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 1410 can be or can include one or more hardware components architected in accordance with an ARM architecture, available for license from ARM HOLDINGS of Cambridge, United Kingdom. Alternatively, the compute resources 1410 can be or can include one or more hardware components architected in accordance with an x86 architecture, such an architecture available from INTEL CORPORATION of Mountain View, Calif., and others. Those skilled in the art will appreciate the implementation of the compute resources 1410 can utilize various computation architectures, and as such, the compute resources 1410 should not be construed as being limited to any particular computation architecture or combination of computation architectures, including those explicitly disclosed herein.

The memory resource(s) 1412 can include one or more hardware components that perform storage/memory operations, including temporary or permanent storage operations. In some embodiments, the memory resource(s) 1412 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 1410.

The other resource(s) 1414 can include any other hardware resources that can be utilized by the compute resources(s) 1410 and/or the memory resource(s) 1412 to perform operations described herein. The other resource(s) 1414 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 1402 can be virtualized by one or more hypervisors 1416A-1416N (also known as "virtual machine monitors") operating within the hypervisor layer 1404 to create virtual resources that reside in the virtual resource layer 1406. The hypervisors 1416A-1416N can be or can include software, firmware, and/or hardware that alone or in combination with other software, firmware, and/or hardware, creates and manages virtual resources 1417A-1417N operating within the virtual resource layer 1406.

The virtual resources 1417A-1417N operating within the virtual resource layer 1406 can include abstractions of at least a portion of the compute resources 1410, the memory resources 1412, and/or the other resources 1414, or any combination thereof. In some embodiments, the abstractions can include one or more virtual machines, virtual volumes, virtual networks, and/or other virtualizes resources upon which one or more VNFs 1418A-1418N can be executed. The VNFs 1418A-1418N in the virtual function layer 1407 are constructed out of the virtual resources 1417A-1417N in the virtual resource layer 1406. In the illustrated example, the VNFs 1418A-1418N can provide, at least in part, one or more services 1420A-1420N in the service layer 1408.

Based on the foregoing, it should be appreciated that systems and methods for seamless reconfiguration of distributed stateful network functions have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
a gateway;
a plurality of network function nodes; and
a distributed load balancer comprising a plurality of load balancer nodes each having a flow table portion stored thereon, wherein the plurality of load balancer nodes forms, at least in part, a node chain having a tail node and a head node, and wherein the distributed load balancer comprises instructions that, when executed by a processor, causes the distributed load balancer to perform operations at the plurality of load balancer nodes, the operations comprising
receiving, at a first load balancer node of the plurality of load balancer nodes, a packet from the gateway,
in response to receiving the packet, generating, by the first load balancer node, a query directed to the tail node of the node chain, wherein the query identifies the packet and a network function identifier associated with a network function node that is proposed to handle a connection for the packet,
determining, by the tail node, whether an entry for the connection exists in the flow table portion associated with the tail node,
in response to determining that an entry for the connection does not exist in the flow table portion associated with the tail node, initiating, by the tail node, an insert request for writing the entry for the connection, wherein the insert request is directed to the head node,
determining, by each of the plurality of load balancer nodes, whether the insert request begins with the head node, and in response to determining that the insert request begins with the head node, writing, by each load balancer node of the plurality of load balancer nodes, the entry for the connection into the flow table portion corresponding to each respective one of the plurality of load balancer nodes in the node chain.

2. The system of claim 1, wherein the operations further comprise:
forwarding, by the tail node of the node chain, a response to the first load balancer node; and
sending, by the first load balancer node, the packet to the network function node.

3. The system of claim 1, wherein each load balancer node to be included in the node chain is computed based upon a unique connection key derived from a 5-tuple of a header of the packet, a node identifier, and a length of the node chain.

4. The system of claim 3, wherein the tail node of the node chain is computed by mapping the unique connection key to a circular keyspace and subsequently to a specific load balancer node of the plurality of load balancer nodes using a consistent hash function.

5. The system of claim 4, wherein the head node of the node chain is a predecessor node of the tail node determined by the length of the node chain minus one node.

6. The system of claim 1, wherein the node chain is reconfigured causing an inconsistency in the entry of at least one flow table portion among the plurality of load balancer nodes and wherein the operations further comprise executing a synchronization protocol to restore the entry to each of the plurality of load balancer nodes in the node chain.

7. The system of claim 6, further comprising a controller comprising controller instructions that, when executed by a controller processor, causes the controller to perform controller operations comprising executing a controller protocol to confirm that each of the plurality of load balancer nodes in the node chain are synchronized after the node chain is reconfigured.

8. A method comprising:
receiving, at a first load balancer node of a plurality of load balancer nodes of a distributed load balancer, a packet from a gateway, wherein the plurality of load balancer nodes each have a flow table portion stored thereon, and wherein the plurality of load balancer nodes forms, at least in part, a node chain having a tail node and a head node;
in response to receiving the packet, generating, by the first load balancer node, a query directed to the tail node of the node chain, wherein the query identifies the packet and a network function identifier associated with a network function node that is proposed to handle a connection for the packet;
determining, by the tail node, whether an entry for the connection exists in the flow table portion associated with the tail node;
in response to determining that an entry for the connection does not exist in the flow table portion associated with the tail node, initiating, by the tail node, an insert request for writing the entry for the connection, wherein the insert request is directed to the head node;
determining, by each of the plurality of load balancer nodes, whether the insert request begins with the head node; and
in response to determining that the insert request begins with the head node, writing, by each load balancer node of the plurality of load balancer nodes, the entry for the connection into the flow table portion corresponding to each respective one of the plurality of load balancer nodes in the node chain.

9. The method of claim 8, further comprising:
forwarding, by the tail node of the node chain, a response to the first load balancer node; and
sending, by the first load balancer node, the packet to the network function node.

10. The method of claim 8, further comprising computing each load balancer node to be included in the node chain based upon a unique connection key derived from a 5-tuple of a header of the packet, a node identifier, and a length of the node chain.

11. The method of claim 10, further comprising computing the tail node of the node chain by mapping the unique connection key to a circular keyspace and subsequently to a specific load balancer node of the plurality of load balancer nodes using a consistent hash function.

12. The method of claim 11, further comprising computing the head node of the node chain to be a predecessor node of the tail node determined by the length of the node chain minus one node.

13. The method of claim 8, further comprising:
reconfiguring the node chain causing an inconsistency in the entry of at least one flow table portion among the plurality of load balancer nodes; and
executing a synchronization protocol to restore the entry to each of the plurality of load balancer nodes in the node chain.

14. The method of claim 13, further comprising executing, by a controller, a controller protocol to confirm that each of the plurality of load balancer nodes in the node chain are synchronized after the node chain is reconfigured.

15. A computer storage medium having computer-executable instructions stored thereon that, when executed by a processor of a distributed load balancer, cause the distributed load balancer to perform operations comprising:
receiving, at a first load balancer node of a plurality of load balancer nodes of the distributed load balancer, a packet from a gateway;
in response to receiving the packet, generating, by the first load balancer node, a query directed to a tail node of a node chain formed, at least in part, by the plurality of load balancer nodes, wherein the query identifies the packet and a network function identifier associated with a network function node that is proposed to handle a connection for the packet;
determining, by the tail node, whether an entry for the connection exists in the flow table portion associated with the tail node;
in response to determining that an entry for the connection does not exist in the flow table portion associated with the tail node, initiating, by the tail node, an insert request for writing the entry for the connection, wherein the insert request is directed to a head node of the node chain;
determining, by each of the plurality of load balancer nodes, whether the insert request begins with the head node; and
in response to determining that the insert request begins with the head node, writing, by each load balancer node of the plurality of load balancer nodes, the entry for the connection into the flow table portion corresponding to each respective one of the plurality of load balancer nodes in the node chain.

16. The computer storage medium of claim 15, wherein the operations further comprise:
forwarding, by the tail node of the node chain, a response to the first load balancer node; and
sending, by the first load balancer node, the packet to the network function node.

17. The computer storage medium of claim 15, wherein the operations further comprise computing each load balancer node to be included in the node chain based upon a unique connection key derived from a 5-tuple of a header of the packet, a node identifier, and a length of the node chain.

18. The computer storage medium of claim 17, wherein the operations further comprise computing the tail node of the node chain by mapping the unique connection key to a circular keyspace and subsequently to a specific load balancer node of the plurality of load balancer nodes using a consistent hash function.

19. The computer storage medium of claim 18, wherein the operations further comprise computing the head node of the node chain to be a predecessor node of the tail node determined by the length of the node chain minus one node.

20. The computer storage medium of claim 15, wherein the operations further comprise:
reconfiguring the node chain causing an inconsistency in the entry of at least one flow table portion among the plurality of load balancer nodes;
executing a synchronization protocol to restore the entry to each of the plurality of load balancer nodes in the node chain; and
executing, by a controller, a controller protocol to confirm that each of the plurality of load balancer nodes in the node chain are synchronized after the node chain is reconfigured.

* * * * *